United States Patent [19]
Podkowa et al.

[11] Patent Number: 5,829,008
[45] Date of Patent: Oct. 27, 1998

[54] REAL-TIME CLOCK WITH EXTENDABLE MEMORY

[75] Inventors: William J. Podkowa, Plano; Douglas Scott Bankes, Allen, both of Tex.

[73] Assignee: Dallas Semiconductor Corporation, Dallas, Tex.

[21] Appl. No.: 846,752

[22] Filed: Apr. 30, 1997

Related U.S. Application Data

[63] Continuation of Ser. No. 13,917, Feb. 5, 1993, Pat. No. 5,678,019.
[51] Int. Cl.⁶ .................................................... G06F 12/02
[52] U.S. Cl. ................................ 711/5; 711/1; 711/202; 395/551; 395/557; 377/26
[58] Field of Search .................................. 711/1, 5, 100, 711/200; 345/515, 508; 395/551, 557

[56] References Cited

U.S. PATENT DOCUMENTS

| | | | |
|---|---|---|---|
| 4,047,245 | 9/1977 | Knipper | 711/213 |
| 4,168,531 | 9/1979 | Eichelberger et al. | 395/557 |
| 4,462,028 | 7/1984 | Ryan et al. | 345/193 |
| 4,628,467 | 12/1986 | Nishi et al. | 345/516 |
| 5,226,134 | 7/1993 | Aldereguia et al. | 711/5 |

*Primary Examiner*—Kee M. Tung
*Attorney, Agent, or Firm*—Jenkens & Gilchrist, P.C.

[57] ABSTRACT

A real time clock plus user memory and extra memory integrated in a single circuit with access to the extra memory either by direct addressing or by providing the address as data to specified addresses in the user memory. Further, the user memory has two banks with the same addresses, and bank selection derives from a bit in another portion of the user memory.

5 Claims, 16 Drawing Sheets

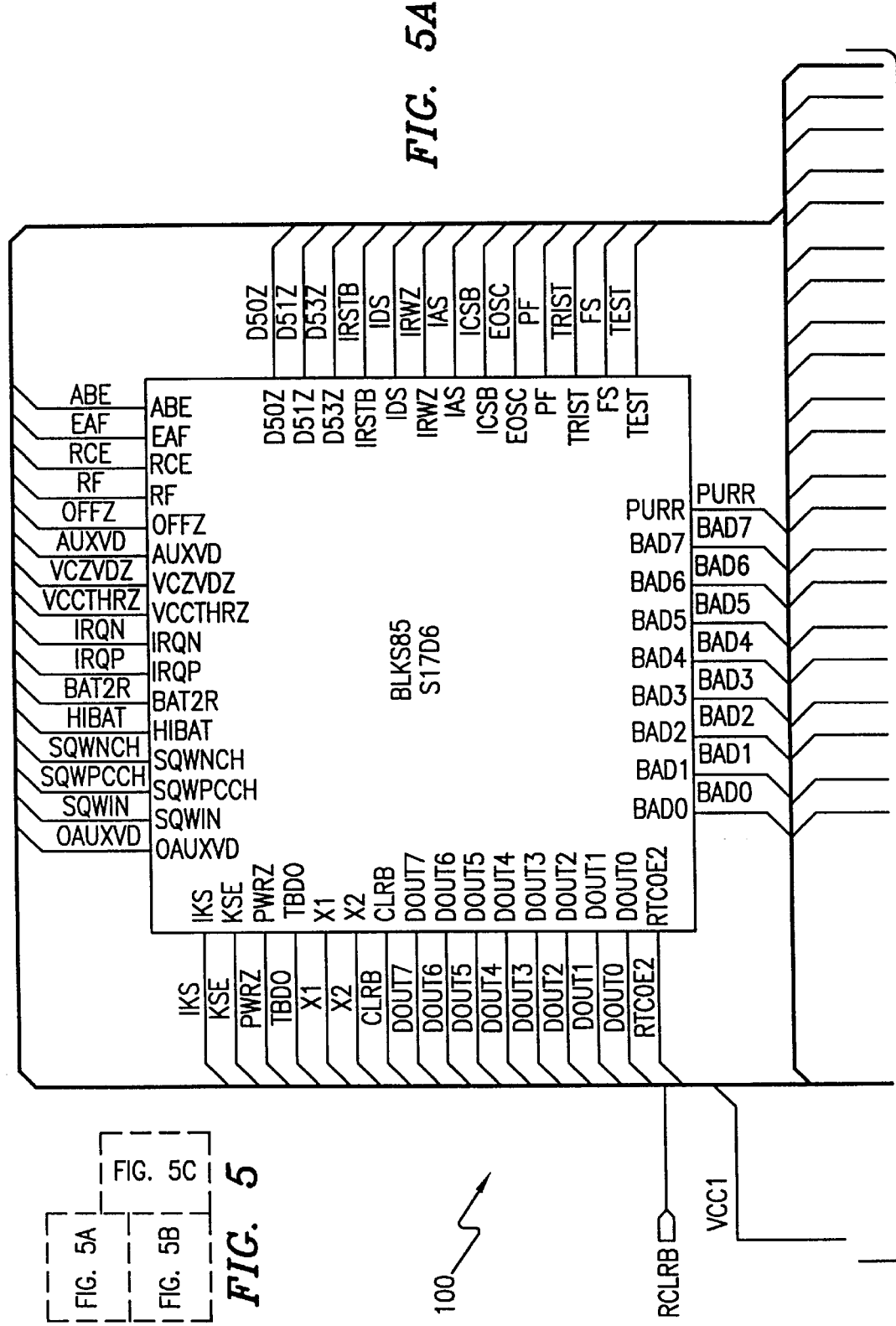

REAL-TIME CLOCK WITH EXTENDABLE MEMORY

CROSS-REFERENCE TO RELATED APPLICATIONS

This application is a continuation of application Ser. No. 08/013,917, filed Feb. 5, 1993, U.S. Pat. No. 5,678,019.

BACKGROUND AND SUMMARY OF THE INVENTION

The following applications, assigned to the assignee of this application, disclose related subject matter: Ser. No. 07/618,433, filed Nov. 27,1990, abandoned in favor of file wrapper continuation Ser. No. 08/102,116, filed Aug. 4, 1993; Ser. No. 07/684,684, filed Apr. 11, 1991, now U.S. Pat. No. 5,333,295, issued Jul. 26, 1994.

The present invention relates to electronic devices, and, more particularly, to timekeeping devices useful in personal computers.

Personal computers typically include a clock/calendar that tracks the time of day, day, month, and year. Such a clock/calendar has various uses such as time stamping files and inserting dates into documents like letters. The clock/calendar must be programmable for setting or changing the date or time of day. A clock/calendar will typically be implemented in specific hardware with a dedicated crystal oscillator to insure accuracy and a battery backup power supply to insure preservation of timekeeping data during an interruption of the primary power supply. This is especially important with personal computers which are frequently powered down.

In addition to timekeeping data, computers often also contain data in main memory that preferably should not be lost upon power supply interruption. Thus devices such as the DS1287 Real Time Clock manufactured by Dallas Semiconductor Corporation provides a single package which includes both an integrated circuit timekeeping function with battery backup and crystal oscillator plus 50 bytes of nonvolatile general purpose RAM. The DS1287 is designed to fit into an IBM AT type personal computer and other such machines. Of course, larger nonvolatile RAM would be more desirable, and such a timekeeping plus RAM circuit must be very low power to provide long battery lifetime.

However, merely attaching an external RAM to a device such as the DS1287 gives rise to a problem of deciphering an address as either external memory or device memory.

Other features of a clock/calendar such as the DS1287 include interrupts generated by alarms set for programmed times. Such interrupts involve setting flags, and with two or more flags which are user writable, inconsistencies can develop.

The present invention provides a clock/calendar compatible with the DS1287 plus additional RAM having both hardware and software access, the software access uses indirect addressing in registers duplicative of the clock/calendar memory space registers and made accessible by control bits set in a clock/calendar memory space register. Further, interrupt flags have built in arbitration.

BRIEF DESCRIPTION OF THE DRAWINGS

The drawings are schematic for clarity.

FIGS. 5A–5C, taken together, depict a top level schematic diagram for the first preferred embodiment;

FIGS. 19–20 shows the timing for address signal propagation;

FIG. 39 shows an alternative power on time out delay.

DESCRIPTION OF THE PREFERRED EMBODIMENTS

Overview

Figure 1A:
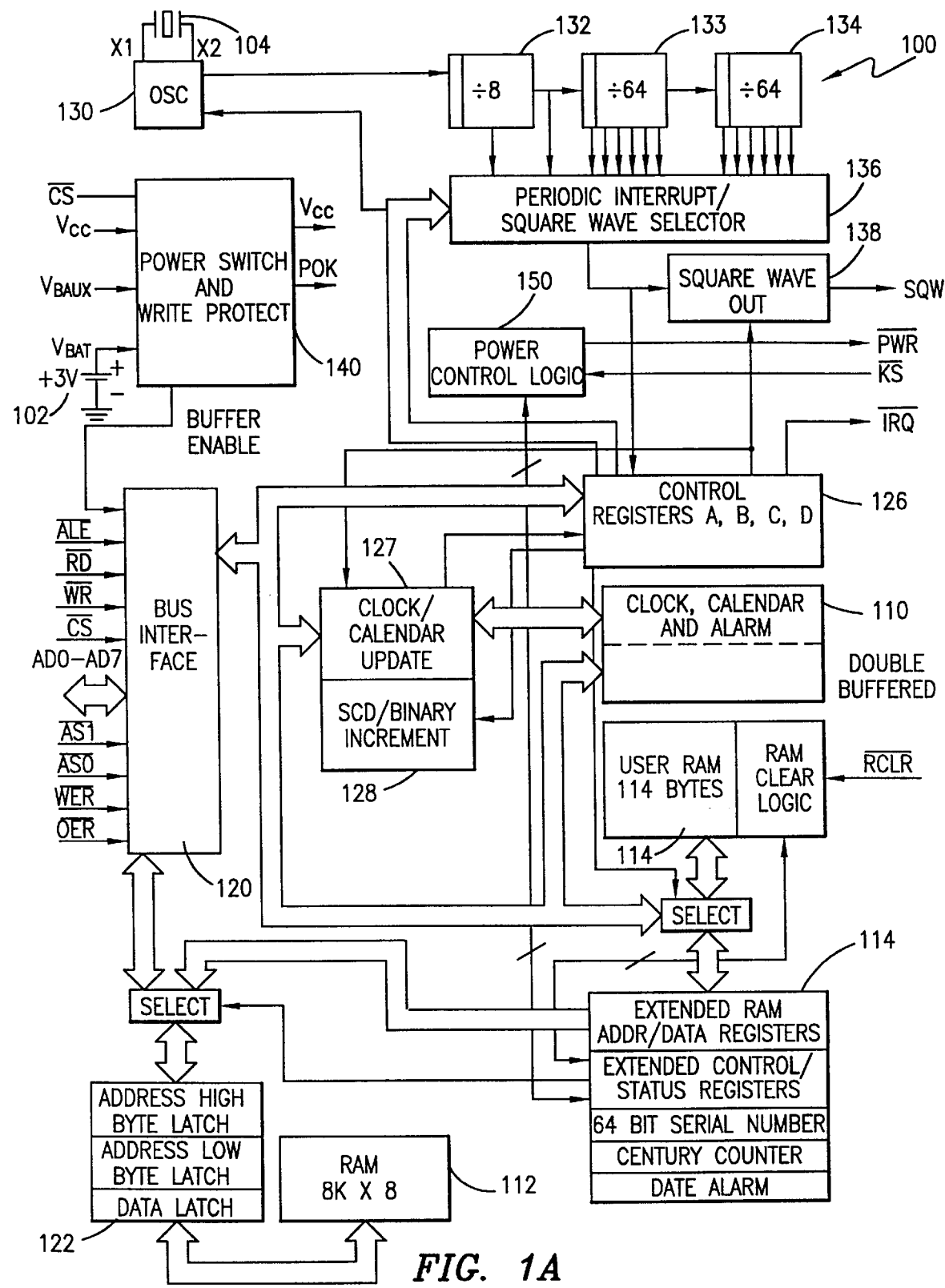
FIG. 1a is a functional block diagram of a first preferred embodiment.
Figure 3A:
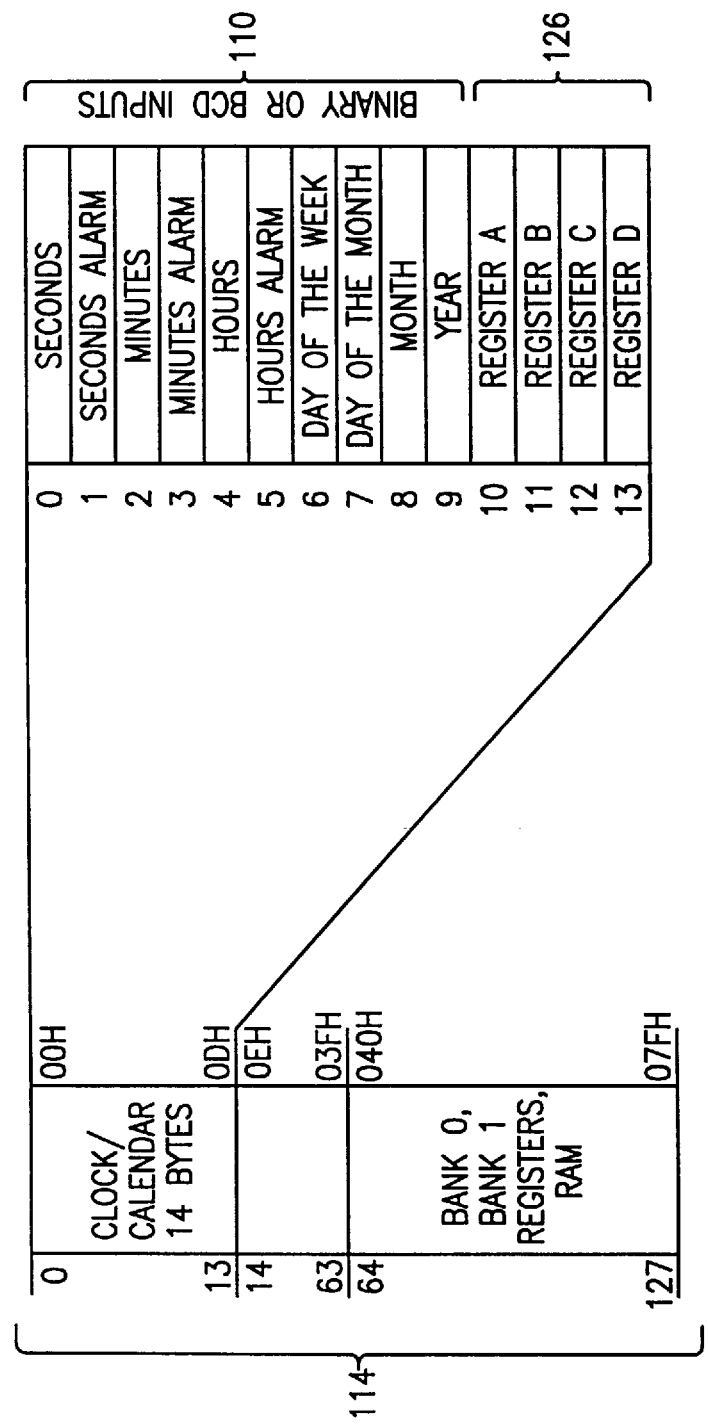
FIGS. 3a–b illustrate the user memory address space for the first preferred embodiment.
Figure 3B:
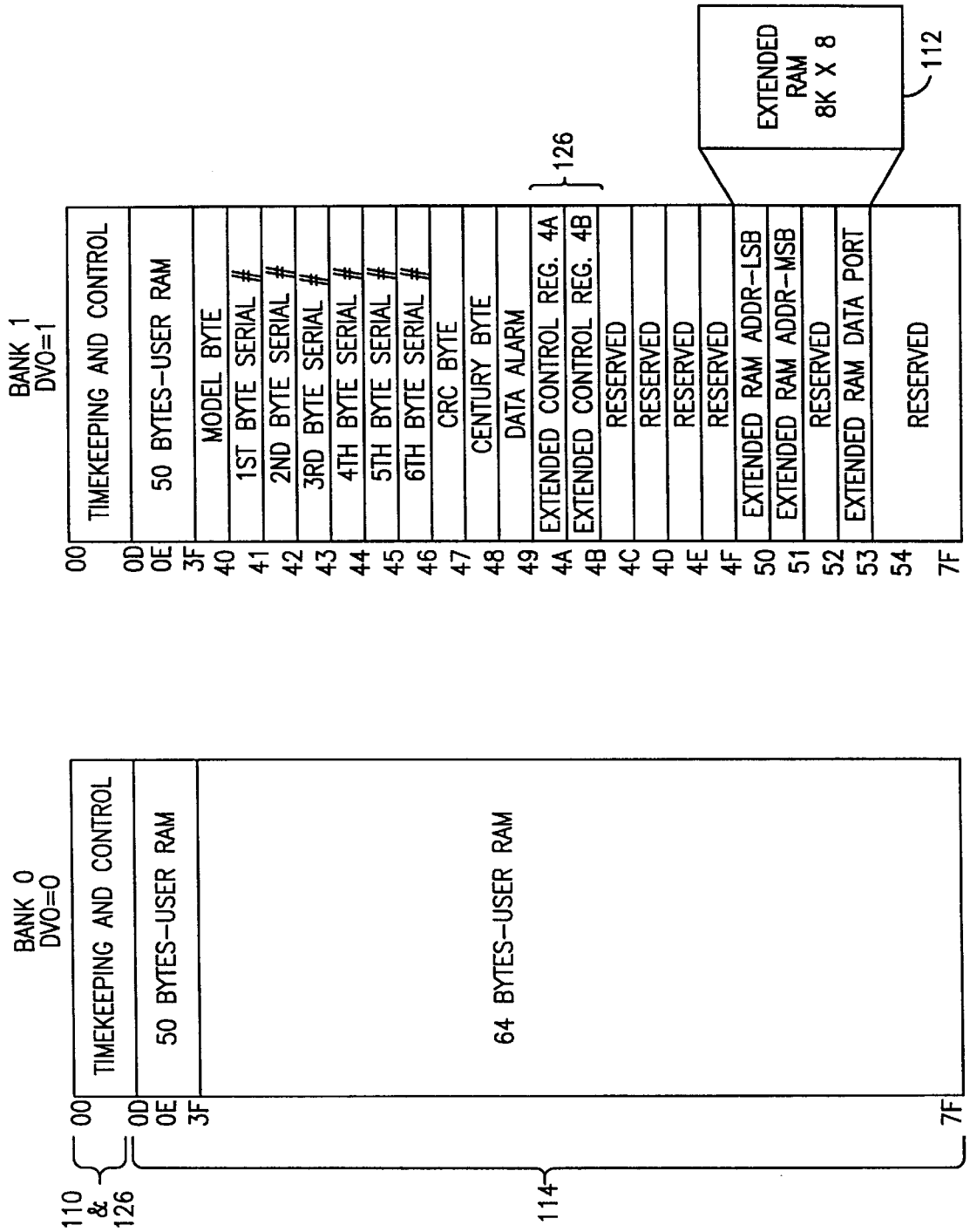
Figure 4:
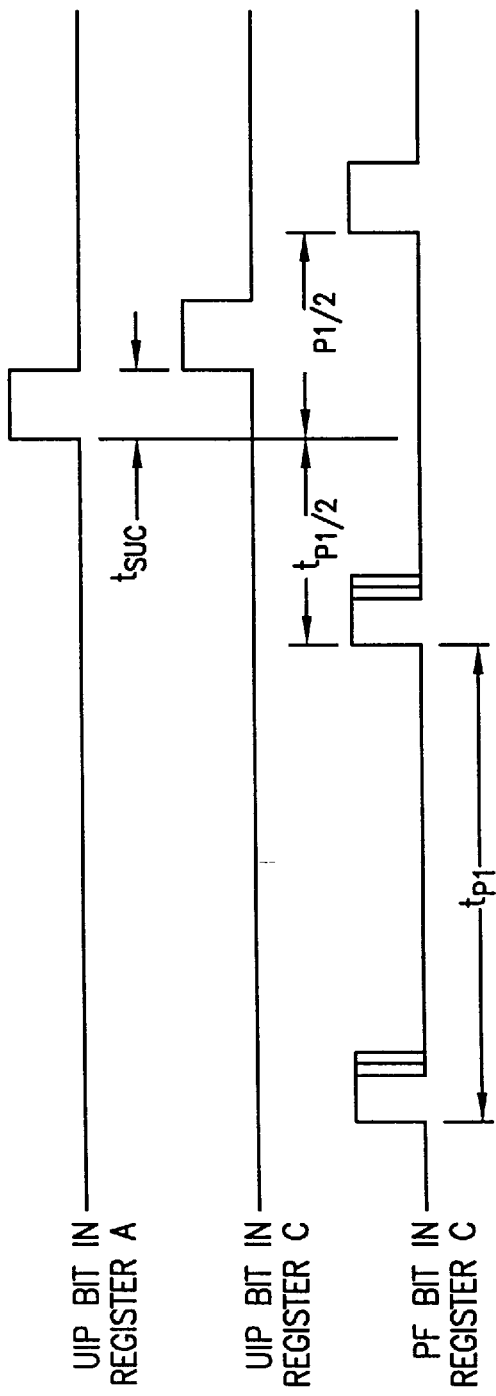
FIG. 4 shows the timing for time updating.

FIG. 1a is a functional block diagram of a first preferred embodiment clock memory, generally denoted by reference numeral 100, and shown to include battery 102 and oscillator crystal 104, although these items could be packaged separately. Clock 100 includes 10 bytes of RAM 110 for storing timekeeping data (see FIG. 3a), 4 bytes of RAM in control Registers A–D 126, 178 bytes of of RAM 114 organized into two banks as illustrated in FIG. 3b as described in the following, and 8K bytes of RAM 112. Other portions of clock 100 are the bus interface 120, address stack 122, clock/calendar updater 127, BCD/binary incrementer 128, crystal oscillator 130, dividers 132–134, square wave generator 136 and output buffer 138, external power voltage sensor and switch 140, power control circuitry 150 which allows the system to be powered on via the keyboard or by a time and date (wake up) alarm, and internal busses and memory selectors. Note that for signal or pin or node names, a trailing "\" or "B" indicates active low and corresponds to an overline or suffix "B" in the drawings. The PWR\ output pin can be triggered by one or either of keyboard or wake up events, and can be used to turn on an external power supply. The PWR\ pin is under software control, so that when a task is complete, the system power can then be shut down.

Figure 1B:
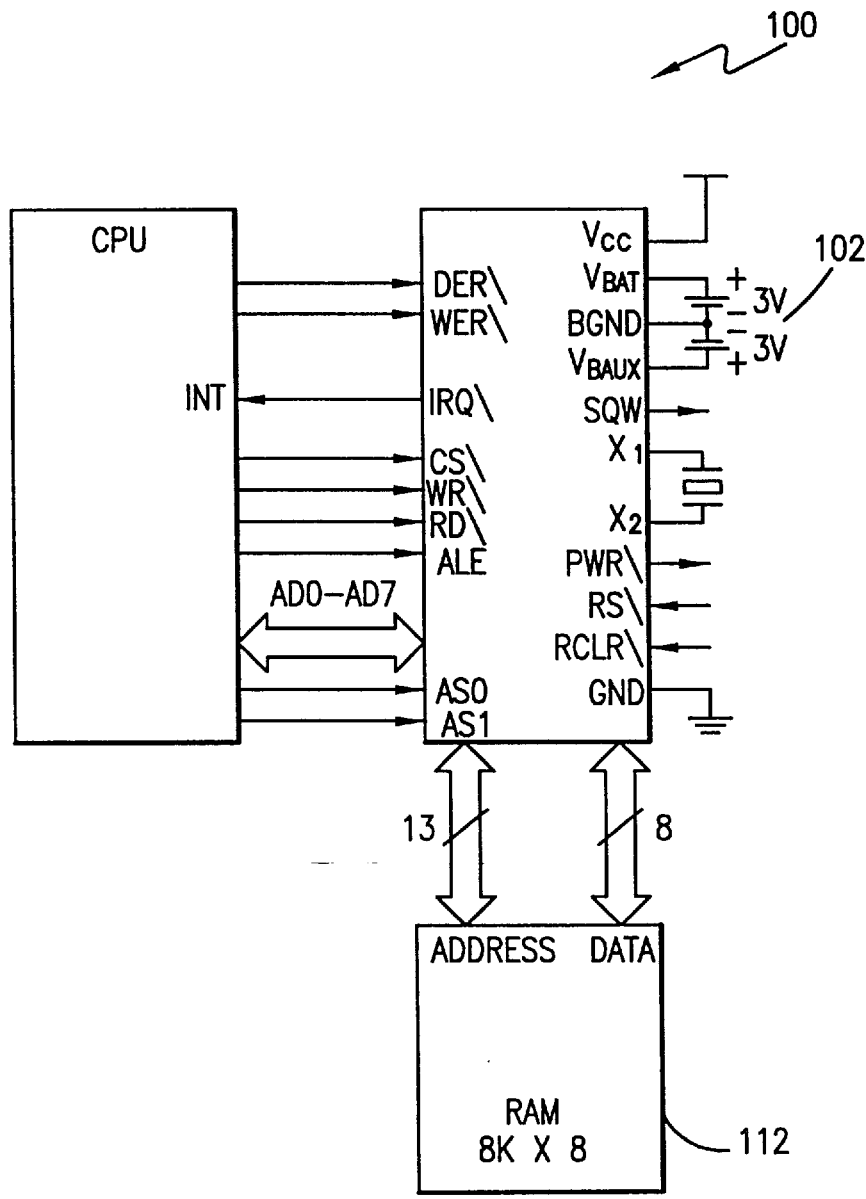
FIG. 1b illustrates an application of the first preferred embodiment.

Clock 100 may be packaged as a drop-in replacement for real time clocks such as the DS1287 in personal computers. Indeed, FIG. 1b illustrates an application of clock 100 with the crystal, battery, and RAM 112 shown as separate items.

The operation of clock 100 roughly is as follows. The real time clock begins with oscillator 130 generating a 32.768 KHz square wave which is divided by 8 in divider 132, by a further 64 in divider 133, and another 64 in divider 134 to output a square wave of selectable frequencies. Once per second updater 127 increments the timekeeping data stored in RAM 110. RAM 112 and 114 and control registers 126 are essentially independent of the real time clock, and the addresses and data are multiplexed on a single 8-bit bus. Indeed, the RAMs and control registers may all be read during the updating of the timekeeping data in RAM 110. The 8K RAM 112 requires 13-bit addresses and is addressed either in hardware with two successive address bytes or in software using address bits loaded into extended registers in bank 1; this is detailed in the following. RAMs 110 and 114 and control registers 126 are addressed with one byte. FIGS. 3a–b illustrate the address map for RAMs 110 and 114 plus control registers 126. The 114 bytes of RAM 114 in bank 0 is termed the "User RAM" and the corresponding bytes in bank1 are either suplicative (the 50 bytes with low addresses) or used for other purposes.

Additionally, clock 100 may be individually manufactured with a unique 64-bit serial number. The serial number is written by laser and tested to insure that no two devices are alike. As a result, the serial number can be used to electronically identify a system for purposes such as establishment of a network node address, or for maintenance. The serial number resides in bank 1 of RAM 114 as illustrated in FIG. 3b.

Pin Signals

The block diagram in FIG. 1a shows the pin connections with the major internal functions of the clock 100, and FIG. 5 illustrates the functional blocks of clock 100 with the pin connections labelled. The following paragraphs describe the function of each pin and the signals on the pin.

GND, $V_{CC}$–DC power is provided to the device on these pins. $V_{CC}$ is the +5 volt input. When 5 volts are applied within normal limits, the device is fully accessible and data can be written and read. When $V_{CC}$ is below 4.25 volts typical, reads and writes are inhibited. However, the timekeeping function continues unaffected by the lower input voltage. As $V_{CC}$ falls below 3 volts typical, the RAM and timekeeper are switched over to lithium battery connected either to the $V_{BAT}$ pin or $V_{BAUX}$ pin. The timekeeping function maintains an accuracy of ±1 minute per month at 25° C. regardless of the voltage input on the $V_{CC}$ pin.

SQW (Square Wave Output)—The SQW pin can output a signal from one of the 13 taps provided by the 15 internal divider stages of the real time clock. The frequency of the SQW pin can be changed by programming Register A as shown in Table 2. The SQW signal can be turned on and off using the SQWE bit in Register B. A 32 kHz SQW signal is output when SQWE=1 and the Enable 32 kHz (E32K) in extended register 04BH and $V_{CC}$ is above 4.25V. A 32 kHz square wave is also available when $V_{CC}$ is less than 4.25 volts typical if E32K=1, ABE=1, and voltage applied to $V_{BAUX}$.

AD0–AD7 (Multiplexed Bidirectional Address/Data Bus) —Multiplexed busses save pins because address information and data information time share the same signal paths. The addresses are present during the first portion of the bus cycle and the same pins and signal paths are used for data in the second portion of the cycle. Address/data multiplexing does not slow the access time because the bus change from address to data occurs during the internal RAM access time. Addresses must be valid prior the latter portion of ALE, AS0\, or AS1\, at which time clock 100 latches the address from AD0 to AD7. Valid write data must be present and held stable during the latter portion of the WR\ or WER\ pulses. In a read cycle clock 100 outputs 8 bits of data during the latter portion of the RD\ or OER\ pulses. The read cycle is terminated and the bus returns to a high impedance state as RD\ or OER\ transitions high.

ALE\ or AS (RTC Address Strobe Input)—A pulse on the address strobe pin serves to demultiplex the bus. The falling edge of ALE causes the RTC address to be latched within clock 100.

RD\ or DS (RTC Read Input—RD\ identifies the time period when clock 100 drives the bus with RTC read data. The RD\ signal is an enable signal for the output buffers of the clock.

WR\ or RWZ (RTC Write Input)—The WR\ signal is an active low signal. The WR\ signal defmes the time period during which data is written to the addressed clock register.

CS\ or CSB (RTC Chip Select Input)—The Chip Select signal must be asserted low during a bus cycle for the RTC portion of clock 100 to be accessed. CS\ must be kept in the active state during RD\ and WR\ timing. Bus cycles which take place with ALE asserted but without asserting CS\ will latch addresses. However, no data transfer will occur.

IRQ\ (Interrupt Request Output)—The IRQ\ PIN is an active low output of clcok 100 that can be tied to the interrupt input of a processor. The IRQ\ output remains low as long as the status bit causing the interrupt is present and the corresponding interruptenable bit is set. To clear the IRQ\ pin, the application software must clear all enabled flag bits contributing to IRQ's active state.

When no interrupt conditions are present, the IRQ\ level is in the high impedance state. Multiple interrupting devices can be connected to an IRQ\ bus. The IRQ\ pin is an open drain output and requires an external pull-up resistor.

AS0\ or AS0Z (RAM Address Strobe Zero)—The rising edge of AS0\ latches the lower eight bits of the 8K×8 extended RAM address.

AS1\ or AS1Z (RAM Address Strobe One)—The rising edge of AS1\ latches the upper five bits of the 8K×8 extended RAM address.

OER\ or OERB (RAM Output Enable)—OER\ is active low and identifies the time period when clock 100 drives the bus with 8K×8 extended RAM data.

WER\ or WERB (RAM Write Enable)—WER\ is an active low signal and defines the time period during which data is written to the 8K×8 extended RAM portion of clock 100.

PWR\—Power On Output; open drain; active low. The PWR\ pin is intended for use as an on/off control for the system power. With $V_{CC}$ voltage removed from clock 100, PWR\ may be automatically activated from a Kickstart input via the KS\ pin or from a Wake Up interrupt. Once the system is powered on, the state of the PWR\ can be controlled via bits in the registers.

KS\ or KSB (Kickstart input, active low)—When $V_{CC}$ is removed from clock 100, the system can be powered on in response to an active low transition on the KS\ pin, as might be generated from a key closure. $V_{BAUX}$ must be present and ABE must be set to 1 if the kickstart function is used, and the KS\ pin must be pulled up to the $V_{BAUX}$ supply. One should not apply a positive voltage to the KS\ pin that exceeds $V_{BAUX}$ while in battery-back mode. While $V_{CC}$ is applied, the KS\ pin can be used as an interrupt input.

RCLR\ or RCLRB—RAM Clear Input; active low. If enabled by software, taking RCLR\ low will result in the clearing of the 114 bytes of user RAM. When enabled, RCLR\ can be activated whether or not $V_{CC}$ is present.

$V_{BAUX}$—Auxiliary battery input required for kickstart and wake up features. Also supports clock/calendar and NVRAM function if $V_{BAT}$ at lower voltage or not present. Standard +3 volt lithium cell or other energy source can be used. Battery voltage must be held between +2.5 and +3.7 volts for proper operation. If $V_{BAUX}$ is not going to be used it should be grounded and auxiliary battery enable bit bank 1, register O1BH, should equal to 0.

X1, X2—Connections for a standard 32.768 KHz quartz crystal. The crystal may be packaged with the integrated circuit or externally connected.

$V_{BAT}$—Battery input for any standard 3 Volt lithium cell or other energy source. This primary battery may be packaged with the integrate circuit (along with the crystal) or may be externally connected. Battery voltage must be held between 2.5 and 3.7 volts for proper operation. The nominal write protect trip point voltage is set by the internal circuitry and is 4.25 volts typical. A maximum load of μA at 25° C. and 3.0V on $V_{BAT}$ should be used to size the external energy source.

BGND—Ground for battery inputs

Power-down/Power-up Considerations

The real-time clock function of clock 100 will continue to operate and all of the RAM, time, calendar, and alarm memory locations remain nonvolatile regardless of the level of the $V_{CC}$ input. When $V_{CC}$ is applied to clock 100 and reaches a level of greater than 4.25 volts, the device becomes accessible after 100 ms, provided that the oscillator is running and the oscillator countdown chain is not in reset (see Register A). This time period allows the system to stabilize after power is applied. When $V_{CC}$ falls below 4.25 volts, the chip is internally disabled and is, therefore, write-protected. With the possible exception of the KS\, PWR\, and SQW pins, all inputs are ignored and all outputs are in a high impedance state. When clock 100 is in a write-protected state, $V_{CC}$ falls below a level of approximately 3 volts, the external $V_{CC}$ supply is switched off and either the internal lithium energy source or the auxiliary battery supplies power to the real-time clock and the RAM memory.

RTC Address Map

The address map for the RTC registers 110 plus 126 of clock 100 is shown in FIG. 3a. The address map consists of the 14 clock/calendar registers. Ten registers contain the time, calendar, and alarm data, and four bytes are used for control and status. All registers can be directly written or read except for the following:
1. Registers C and D are read-only.
2. Bit-7 of Register A is read-only.
3. The high order bit of the seconds byte is read-only.

Time, Calendar, and Alarm Locations

The time and calendar information is obtained by reading the appropriate register bytes shown in Table 1. The time, calendar, and alarm are set or initialized by writing the appropriate register bytes. The contents of the time, calendar and alarm registers can be either Binary or Binary-Coded Decimal (BCD) format. Table 1 shows the binary and BCD formats of the twelve time, calendar, and alarm locations that reside in both bank 0 and in bank 1, plus the two extended registers that reside in bank 1 only (bank 0 and bank 1 switching will be explained in the following).

TABLE 1

TIME, CALENDAR AND ALARM DATA MODES

| Address Location | Function | Decimal Range | Binary Data Mode | BCD Data Mode |
|---|---|---|---|---|
| 00H | Seconds | 0–59 | 00–3B | 00–59 |
| 01H | Seconds Alarm | 0–59 | 00–3B | 00–59 |
| 02H | Minutes | 0–59 | 00–3B | 00–59 |
| 03H | Minutes Alarm | 0–59 | 00–3B | 00–59 |
| 04H | Hours 12-hr. Mode | 1–12 | 01–0C AM, 81–8C PM | 01–12 AM, 81–92 PM |
|  | Hours 24-hr. Mode | 0–23 | 00–17 | 00–23 |
| 05H | Hours Alarm 12-hr. Mode | 1–12 | 01–0C AM, 81–8C PM | 01–12 AM, 81–92 PM |
|  | Hours Alarm 24-hr. Mode | 0–23 | 00–17 | 00–23 |

TABLE 1-continued

TIME, CALENDAR AND ALARM DATA MODES

| Address Location | Function | Decimal Range | Binary Data Mode | BCD Data Mode |
|---|---|---|---|---|
| 06H | Day of Week Sunday = 1 | 1–7 | 01–07 | 01–07 |
| 07H | Date of Month | 1–31 | 01–1F | 01–31 |
| 08H | Month | 1–12 | 01–0C | 01–12 |
| 09H | Year | 0–99 | 00–63 | 00–99 |
| Bank 1, 48H | Century | 0–99 | 00–63 | 00–99 |
| Bank 1, 49H | Date Alarm | 1–31 | 01–1F | 01–31 |

Before writing the internal time, calendar, and alarm registers, the SET bit in Register B should be written to a logic one to prevent updates from occurring while access is being attempted. Also at this time, the data format (binary or BCD) should be set via the data mode bit (DM) of Register B. All time, calendar, and alarm registers must use the same data mode. The set bit in Register B should be cleared after the data mode bit has been written to allow the real-time clock to update the time and calendar bytes.

Once initialized, the real-time clock makes all updates in the selected mode. The data mode cannot be changed without reinitializing the ten data bytes. The 24/12 bit cannot be changed without reinitializing the hour locations. When the 12-hour format is selected, the high order bit of the hours byte represents PM when it is a logic one. The time, calendar, and alarm bytes are always accessible because they are double buffered. Once per second the ten bytes are advanced by one second and checked for an alarm condition. If a read of the time and calendar data occurs during an update, a problem exists where seconds, minutes hours, etc may not correlate. The probability of reading incorrect time and calendar data is low. Several methods of avoiding any possible incorrect time and calendar reads are covered later in this text.

The four alarm bytes can be used in two ways. First, when the alarm time is written in the appropriate hours, minutes, and seconds alarm locations, the alarm interrupt is initiated at the specified time each day if the alarm enable bit is high. The second use condition is to insert a "don't care" state in one or more of the four alarm bytes. The "don't care" code is any hexadecimal value from C0 to FF. The two most significant bits of each byte set the "don't care" condition when at logic 1. An alarm will be generated each hour when the "don't care" bits are set i the hours byte. Similarly, an alarm is generated every minute with "don't care" codes in the hours and minute alarm bytes. The "don't care" codes in all three alarm bytes create an interrupt every second. The three alarm bytes may be used in conjunction with the date alarm as described in the Wakeup/Kickstart section. The century counter will be discussed later in this text.

Control Registers

The four control registers; A, B, C, and D reside in both bank 0 and bank 1. These registers are accessible at all times, even during the update cycle. Note that their addresses (in hex) are simply 0A, 0B, 0C, and 0D, respectively.

Nonvolatile RAM-RTC

The 114 general purpose nonvolatile bytes of RAM 114 are not dedicated to any special function within clock 100.

They can be used by the application program as nonvolatile memory and are fully available during the update cycle. This memory is directly accessible when bank 0 is selected and has addresses (in hex) from 0E through 7F and is termed the "User RAM".

Interrupt Control

Clock 100 includes six separate, fully automatic sources of interrupt for a processor:
1. Alarm interrupt
2. Periodic interrupt
3. Update-ended interrupt
4. Wake up interrupt
5. Kickstart interrupt
6. RAM clear interrupt The conditions which generate each of these independent interrupt conditions are described in greater detail in the following. This section describes the overall control of the interrupts.

The application software can select which interrupts, if any, are to be used. There are a total of six bits including three bits in Register B and three bits in Extended Register B which enable the interrupts. The extended register locations are described later. Writing a logic 1 to an interrupt enable bit permits that interrupt t be initiated when the event occurs. A logic 0 in the interrupt enable bit prohibits the IRQ\ pin from being asserted from that interrupt condition. If an interrupt flag is already set when an interrupt is enable, IRQ\ will immediately be set at an active level, even though the event initiating the interrupt condition may have occurred much earlier. As a result, there are cases where the software should clear these earlier generated interrupts before first enabling new interrupts.

When an interrupt event occurs, the relating flag bit is set to a logic 1 in Register C or in Extended Register A. These flag bits are set regardless of the setting of the corresponding enable bit located either in Register B or in Extended Register B. The flag bit located either in Register B or in Extended Register B. The flag bits can be used in a polling mode without enabling the corresponding enable bits.

However, care should be taken when using the flag bits of Register C as they are automatically cleared to 0 immediately after they are read. Double latching is implemented on these bits to so that bits which are set remain stable throughout the read cycle. All bits which were set are cleared when read and new interrupts which are pending during the read cycle are held until after the cycle is completed. One, two, or three bits can be set when reading Register C. Each utilized flag bit should be examined when read to ensure that no interrupt are lost.

The flag bits in Extended Register A are not automatically cleared following a read. \ -Instead, each flag bit can be cleared to 0 only by writing 0 to that bit.

When using the flag bits with fully enabled interrupts, the IRQ\ line will be driven low when an interrupt flag bit is set and its corresponding enable bit is also set. IRQ\ will be held low as long as at least one of the six possible interrupt sources has its flag and enable bits both set. The IRQF in Register C is a 1 whenever the IRQ\ pin is being driven low as a result of one of the six possible active sources. Therefore, determination that the DS1585/DS1587 initiated an interrupt is accomplished by reading Register C and finding IRQF=1. IRQF will remain set until all enabled interrupt flag bits are cleared to 0.

Square Wave Output Selection

The SQW pin can be programmed to output a variety of frequencies divided down from the 32.768 kHz crystal tied to X1 and X2. The square wave output is enabled and disabled via the SWQE bit in Register B. If the square wave is enabled (SQWE=1), then the output frequency will be determined by the settings of the E32K bit in Extended Register B and by the RS3-0 bits in Register A. If the E32K=1, then a 32.768 kHz square wave will be output on the SQW pin regardless of the settings of RS3-0.

If E32K=0, then the square wave output frequency is determined by the RS3-0 bits. These bits control a 1-of-15 decoder which selects one of thirteen taps that dived the 32.768 kHz frequency. The RS3-0 bits establish the SQW output frequency as shown in Table 2. In addition, RS3-0 bits control the periodic interrupt selection as described below.

If SQWE1, E32K=1, and the Auxiliary Battery Enable bit (ABE, bank 1; register 04BH) is enabled and voltage is applied to $V_{BAUX}$ then the 32 kHz square wave output signal will be output on the SQW pin in the absence of $V_{CC}$. The facility is provided to clock external power management circuitry. If any of the above requirements are not met, \ -no square wave output signal will be generated on the SQW pin in the absence of $V_{CC}$.

Oscillator Control Bits

When clock 100 timekeeping module with crystal and lithium battery is shipped from the factory, the internal oscillator is turned off. This feature prevents the lithium battery from being used until it is installed in a system.

A pattern of 01X in the DV2, DV1, and DV0 bits, respectively, of Register A will turn the oscillator on and enable the countdown chain. Note that this is different than the DS1287, which required a pattern of 010 in these bits. DV0 is now a "don't care" because it is used for selection between register banks 0 and 1.

A pattern of 11X will turn the oscillator on, but the oscillator's countdown chain will be held in reset, as it was in the DS1287. Any other bit combination for DV2 and DV1 will keep the oscillator off.

Periodic Interrupt Selection

The periodic interrupt will cause the IRQ\ pin to go to an active state form once every 500 ms to once every 122 μs. This function is separate from the alarm interrupt which can be output from once per second to once pr day. The periodic interrupt rate is selected using the same RS3-0 bits in Register A which select the square wave frequency (see Table 2). Changing the bits affects both the square wave frequency and the periodic interrupt output. However, each function has a separate enable bit in Register B. The SQWE bit controls the square wave output. Similarly, the periodic interrupt is enabled by the PIE bit in Register B. The periodic interrupt can be used with software counters to measure inputs, create output intervals, or await the next needed software function.

Update Cycle

The Serialized RTC executes an update cycle once pr second regardless of the SET bit in Register B. When the SET bit in Register B is set to one, the user copy of the double buffered time, calendar, and alarm bytes is frozen and will not update as the time increments. However, the time countdown chain continues to update the internal copy of the buffer. This feature allows time to maintain accuracy independent of reading or writing the time, calendar, and alarm buffers and also guarantees that time and calendar information is consistent. The update cycle also compares each alarm byte with the corresponding time byte and issues an alarm if a match or a "don't care" code is present in all three positions.

There are three methods that can handle access of the real-time clock that avoid any possibility of accessing inconsistent time and calendar data. The first method uses the update-ended interrupt. If enabled, an interrupt occurs after every up date cycle that indicates that over 999 ms are available to read valid time and data information. If this interrupt is used, the IRQF bit in Register C should be cleared before leaving the interrupt routine.

A second method uses the update-in-progress bit (UIP) in Register A to determine if the update cycle is in progress. The UIP bit will pulse once per second. After the UIP bit goes high, the update transfer occurs 244 µs later. If a low is read on the UIP bit, the t least 244 µs before the time/calendar data will be changed. Therefore, the user should avoid interrupt service routines that would cause the time needed to read valid time/calendar data to exceed 244 µs.

TABLE 2

Periodic Interrupt Rate and Square Wave Output Frequency

| Ext. Reg. B | Select Bits Register A | | | | $t_{PI}$ Periodic Interrupt | SQW Output |
|---|---|---|---|---|---|---|
| E32K | RS3 | RS2 | RS1 | RS0 | Rate | Frequency |
| 0 | 0 | 0 | 0 | 0 | None | None |
| 0 | 0 | 1 | 0 | 1 | 3.90625 ms | 256 Hz |
| 0 | 0 | 0 | 1 | 0 | 7.8125 ms | 128 Hz |
| 0 | 0 | 0 | 1 | 1 | 122.070 µs | 8.192 kHz |
| 0 | 0 | 1 | 0 | 0 | 244.141 µs | 4.096 kHz |
| 0 | 0 | 1 | 0 | 1 | 488.281 µs | 2.048 kHz |
| 0 | 0 | 1 | 1 | 0 | 976.5625 µs | 1.024 kHz |
| 0 | 0 | 1 | 1 | 1 | 1.953125 ms | 512 Hz |
| 0 | 1 | 0 | 0 | 0 | 3.90625 ms | 256 Hz |
| 0 | 1 | 0 | 0 | 1 | 7.8125 ms | 128 Hz |
| 0 | 1 | 0 | 1 | 0 | 15.625 ms | 64 Hz |
| 0 | 1 | 0 | 1 | 1 | 31.25 ms | 32 Hz |
| 0 | 1 | 1 | 0 | 0 | 62.5 ms | 16 Hz |
| 0 | 1 | 1 | 0 | 1 | 125 ms | 8 Hz |
| 0 | 1 | 1 | 1 | 0 | 250 ms | 4 Hz |
| 1 | X | X | X | X | * | 32.768 Hz |

*RS3–RS0 determine periodic interrupt rates as listed for E32K = 0

The third method uses a periodic interrupt to determine if an update cycle is in progress. The UIP bit in Register A is set high between the setting of the PF bit in Register C (see FIG. 3). Periodic interrupt that occur at a rate of greater than $t_{BUC}$ allow valid time and date information to be reached at each occurrence of the periodic interrupt. The reads should be complete within ($t_{PI}/2+t_{BUC}$) to ensure that data is not read during the update cycle.

Register A

Control register A has the following bits

| MSB | | | | | | | LSB |
|---|---|---|---|---|---|---|---|
| BIT 7 | BIT 6 | BIT 5 | BIT 4 | BIT 3 | BIT 2 | BIT 1 | BIT 0 |
| UIP | DV2 | DV1 | DV0 | RS3 | RS2 | RS1 | RS0 |

UIP-The Update In Progress (UIP) bit is a status flag that cam be monitored.

When the UIP bit is a one, the update transfer will soon occur. When the UIP bit is a one, the update transfer will soon occur. When UIP is a zero, the update transfer will not occur for at least 244 µus. The time, calendar, and alarm information in RAM is fully available for access when the UIP bit is zero. The UIP bit is read only. Writing the SET bit in Register B to a one inhibits any update transfer and clears the UIP status bit.

DV0, DV1, DV2 - These bits are defined as follows:

DV2 = Countdown chain

1 - resets countdown chain only if DV1 = 1
0 - countdown chain enabled
DV1 = Oscillator Enable 0 - oscillator off
1 - oscillator on
DV0 = Bank Select 0 - original bank
1 - extended registers A pattern of 01X is the only combination of bits that will turn the oscillator on and allow the RTC to keep time. A patten of 11X will enable the oscillator but holds the countdown chain in reset. The next update will occur at 500 ms after a patten of 01X is written to DV2, DV1, and DV0.

RS3, RS2, RS1, RS0—These four rate-selection bits select one of the 13 taps n the 15 stage divider or disable the divider output. The tap selected can be used to generate an output square wave (SWQ pin) and/or a periodic interrupt. The user can do one of the following:

Enable the interrupt with the PIE bit;
Enable the SQW output pin with the SQWE bit;
Enable both at the same time and the same rate; or
Enable neither.

Table 2 lists the periodic interrupt rates and the square wave frequencies that can be chosen with the RS bits.

Register B

Control register B has the following bits

| MSB | | | | | | | LSB |
|---|---|---|---|---|---|---|---|
| BIT 7 | BIT 6 | BIT 5 | BIT 4 | BIT 3 | BIT 2 | BIT 1 | BIT 0 |
| SET | PIE | AIE | UIE | SQWE | DM | 24/12 | DSE |

SET-When the SET bit is a zero, the update transfer functions normally by advancing the counts once per second. When the SET bit is written to a one, any update transfer is inhibited and the program can initialize the time and calendar bytes without n update occurring in the midst of initializing. Read cycle can be executed in a similar manner. SET is a read/write bit that is not modified by internal functions of clock 100.
PIE-The Periodic Interrupt Enable bit is a read/write bit which allow the Periodic Interrupt Flag (PF) in Register C to drive the IRQ\ pin low. When the PIE bit is set to one, periodic interrupts are generated by driving the IRQ\ pin low at a rate specified by the RS3-RS0 bits of Register A. A zero in the PIE bit blocks the IRQ\ output from being driven by a periodic interrupt, but the Periodic Flag (PF) bit is still set at the periodic rate. PIE is not modified by any internal clock 100 functions.
AIE-The Alarm Interrupt Enable (AIE) bit is a read/write bit which, when set to a one, permits the Alarm Flag (AF) bit in C to assert IRQ\. An alarm interrupt occurs for each second that the three time bytes equal the three alarm bytes including a don't care alarm code of binary 11XXXXXX. When the AIE bit is set to zero, the AF bit does not initiate the IRQ\ signal. The internal functions of clock 100 do not affect the AIE bit.
UIE-The Update Ended Interrupt Enable (UIE) bit is a read/write that enables the Update End Flag (UF) bit in Register C to assert IRQ\. The SET bit going high clears the UIE bit.
SQWE-When the Square Wave Enable (SQWE) bit is set to a one, a square wave signal at the frequency set by the rate-selection bits R53 through RS0 and the E32K bit is driven out on the SQW pin. When the SQWE bit is set to zero, the SQW pin is held low. SQWE is a read/write bit.

-continued

DM-The Data Mode (DM) bit indicates whether tine and calendar information is in binary or BCD format. The DM bit is set by the program to the appropriate format and can be read as required. This bit is not modified by internal functions. A one in DM signifies binary data while a zero in DM specifies Binary Coded Decimal (BCD) data.
24/12-The 24/12 control bit establishes the format of the hours byte. A one indicates the 24-hour mode and a zero indicates the 12-hour mode. This bit is read/write.
DSE-The Daylight Savings Enable (DSE) bit is a read/write bit which enables two special updates when DSE is set to one. On the first Sunday in April the time increments from 1:59:59 am to 3:00:00 AM. On the last Sunday in October when the time first reaches 1:59:59 AM it changes to 1:00:00 AM. These special updates do not occur when the DSE bit is a zero. This bit is not affected by internal functions.

SET—When the SET bit is a zero, the update transfer functions normally by advancing the counts once per second. When the SET bit is written to a one, any update transfer is inhibited and the program can initialize the time and calendar bytes without n update occurring in the midst of initializing. Read cycle can be executed in a similar manner. SET is a read/write bit that is not modified by internal functions of clock 100.

PIE—The Periodic Interrupt Enable bit is a read/write bit which allow the Periodic Interrupt Flag (PF) in Register C to drive the IRQ\ pin low. When the PIE bit is set to one, periodic interrupts are generated by driving the IRQ\ pin low at a rate specified by the RS3-RS0 bits of Register A. A zero in the PIE bit blocks the IRQ\ output from being driven by a periodic interrupt, but the Periodic Flag (PF) bit is still set at the periodic rate. PIE is not modified by any internal clock 100 functions.

AIE—The Alarm Interrupt Enable (AIE) bit is a read/write bit which, when set to a one, permits the Alarm Flag (AF) bit in C to assert IRQ\. An alarm interrupt occurs for each second that the three time bytes equal the three alarm bytes including a don't care alarm code of binary 11XXXXXX. When the AIE bit is set to zero, the AF bit does not initiate the IRQ\ signal. The internal functions of clock 100 do not affect the AIE bit.

UIE—The Update Ended Interrupt Enable (UIE) bit is a read/write that enables the Update End Flag (UF) bit in Register C to assert IRQ\. The SET bit going high clears the UIE bit.

SQWE—When the Square Wave Enable (SQWE) bit is set to a one, a square wave signal at the frequency set by the rate-selection bits RS3 through RS0 and the E32K bit is driven out on the SQW pin. When the SQWE bit is set to zero, the SQW pin is held low. SQWE is a read/write bit.

DM—The Data Mode (DM) bit indicates whether tine and calendar information is in binary or BCD format. The DM bit is set by the program to the appropriate format and can be read as required. This bit is not modified by internal functions. A one in DM signifies binary data while a zero in DM specifies Binary Coded Decimal (BCD) data.

24/12—The 24/12 control bit establishes the format of the hours byte. A one indicates the 24-hour mode and a zero indicates the 12-hour mode. This bit is read/write.

DSE—The Daylight Savings Enable (DSE) bit is a read/write bit which enables two special updates when DSE is set to one. On the first Sunday in April the time increments from 1:59:59 am to 3:00:00 AM. On the last Sunday in October when the time first reaches 1:59:59 AM it changes to 1:00:00 AM. These special updates do not occur when the DSE bit is a zero. This bit is not affected by internal functions.

Register C

Control register C ahs the following bits

| MSB | | | | | | | LSB |
|---|---|---|---|---|---|---|---|
| BIT 7 | BIT 6 | BIT 5 | BIT 4 | BIT 3 | BIT 2 | BIT 1 | BIT 0 |
| IRQF | PF | AF | UF | 0 | 0 | 0 | 0 |

IRQF—The Interrupt Request Flag (IRQF) bit is set to a one when one or more of the following are true:

| PF = PIE = 1 | WF = WIE = 1 |
|---|---|
| AF = AIE = 1 | KF = KSE = 1 |
| UF = UIE = 1 | RF = RIE = 1 | i.e., IRQF = (PF.PIE) + (AF.ALE) + (UF.UIE) + (WF.WIE) + (KF.KSE) + (RF.RIE)

Any time the IRQF bit is a one, the IRQ\ pin is driven low. Flag bits, PF, AF, and UF are cleared after Register C is read by the program.

PF—The Periodic Interrupt Flag (PF) is a read-only bit which is set to a one when an edge is detected on the selected tap of the divider chain. The RS3 through RS0 bits establish the periodic rate. PF is set to a one independent of the state of the PIE bit. When both PF and PIE are ones, the IRQ\ signal is active and will set the IRQF bit. The PF bit is cleared by a software read of Register C.

AF—A one in the Alarm Interrupt Flag (AF) bit indicates that the current time has matched the alarm time. If the AIE bit is also a one, the IRQ\ pin will go low and a one will appear in the IRQF bit. A read of register C will clear AF.

UF—The Update Ended Interrupt Flag (UP) bit is set after each update cycle. When the UIE bit is set to one, the one in UF causes the IRQF bit to be a one which will assert the IRQ\ pin. UF is cleared by reading Register C.

Bit 0 Through Bit 3—These are unused bits of the status Register C. These bits always read zero and cannot be written.

Register D

Control register D has the following bits

| MSB | | | | | | | LSB |
|---|---|---|---|---|---|---|---|
| BIT 7 | BIT 6 | BIT 5 | BIT 4 | BIT 3 | BIT 2 | BIT 1 | BIT 0 |
| VRT | 0 | 0 | 0 | 0 | 0 | 0 | 0 |

VRT-The Valid RAM and Time (VRT) bit indicates that condition of the internal battery (the battery connected to the $V_{BAT}$ pin in the case of the DS 1585) or the battery connected to $V_{BAUX}$, whichever is at a higher voltage. This bit is not writable and should always be a one when read. If a zero is ever present, an exhausted lithium energy source is indicated and both the contents of the RTC data and RAM data are questionable.
BIT 6 through BIT 0-The remaining bits of Register D are not usable. They cannot be written and, when read, they will always read zero.

VRT—The Valid RAM and Time (VRT) bit indicates that condition of the internal battery (the battery connected to the $V_{BAT}$ pin in the case of the DS1585) or the battery connected to $V_{BAUX}$, whichever is at a higher voltage. This bit is not writable and should always be a one when read. If a zero is ever present, an exhausted lithium energy source is indicated and both the contents of the RTC data and RAM data are questionable.

BIT 6 through BIT 0—The remaining bits of Register D are not usable. They cannot be written and, when read, they will always read zero.

Extended Functions

Some extended functions provided by clock 100 are accessed via a software controlled bank switching scheme, as illustrated in FIG. 3b. In bank 0, the clock/calendar registers and 50 bytes of user RAM are in the same locations as for the DS1287. As a result, existing routines implemented within BIOS, DOS, or application software packages for known standard clocks can gain access to clock 100's clock registers with no changes. Also in bank 0, an extra 64 bytes of user RAM are provided at addresses just above the original locations for a total of 114 directly addressable bytes of user RAM.

When bank 1 is selected, the clock/calendar registers and the original 50 bytes of user RAM still appear as in bank 0. However, the registers which provide control and status for the extended functions will be accessed in place of the additional 64 bytes of user RAM. The major extended functions controlled by these registers are listed below:
1. Silicon Revision byte
2. Serial Number
3. Century counter
4. 8 Byte Extended RAM access
5. Auxiliary Battery Control/Status
6. Wake Up
7. Kickstart
8. RAM Clear Control/Status The bank selection is controlled by the state of the DV0 bit in register A. To access bank 0 the DV0 bit should be written to a 0. To access bank 1, DV0 should be written to a 1. Register locations designated as reserved in the bank 1 map are reserve for future use. Bits in these locations cannot be written and will return to a 0 if read.

Silicon Serial Number

A unique 64-bit lasered serial number is located in bank 1 registers 40H–47H. This serial number is divided into three parts. The first byte in register 40H contains a model number to identify the device type and revision of clock 100. Registers 41H–46H contain a unique binary number. Register 47H contains a cyclic redundancy check (CRC) byte used to validate the data in registers 40H–46H. All bytes of the serial number are read only registers.

Century Counter

A register has been added in bank 1, location 48H, to keep track of centuries. The value is read in either binary or BCD according to the setting of the DM bit.

8K×8 RAM

Clock 100 provides an on-chip 8K×8 nonvolatile SRAM 112 which with storage sustained from a lithium battery. On power-up, SRAM 112 is taken out of write-protect status by the internal power OK signal (POK) generated from the write protect circuitry. The POK signal becomes active when external power reaches about 4.25 volts.

SRAM 112 is accessed via the eight multiplexed address/data lines AD7-AD0. Access to the SRAM is controlled by three on-chip latch registers. Two registers are used to hold the 13-bit SRAM address and form address stack block ERAREG of FIG. 5, and the third register is used to hold read/write data and is in block XRAMBLK which contains SRAM 112. The SRAM address space is from 0000H to 1FFFH. A direct hardware interface to the SRAM as well as indirect access under software control is supported.

Figure 2A:
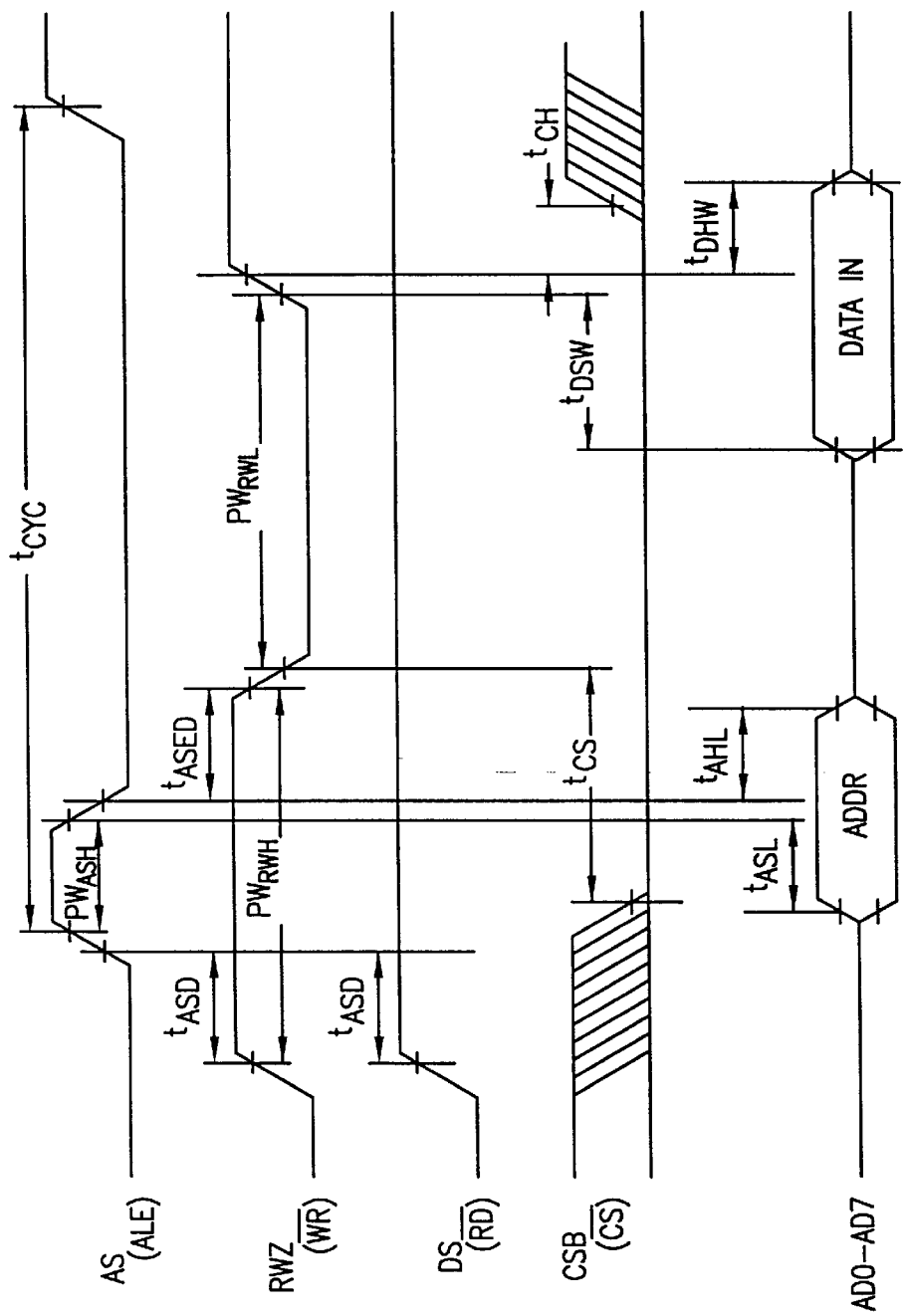
FIGS. 2a–e show timing for reads and writes of the memories of the embodiment of FIG. 1a plus timing for a wake up or kickstart.
Figure 2B:
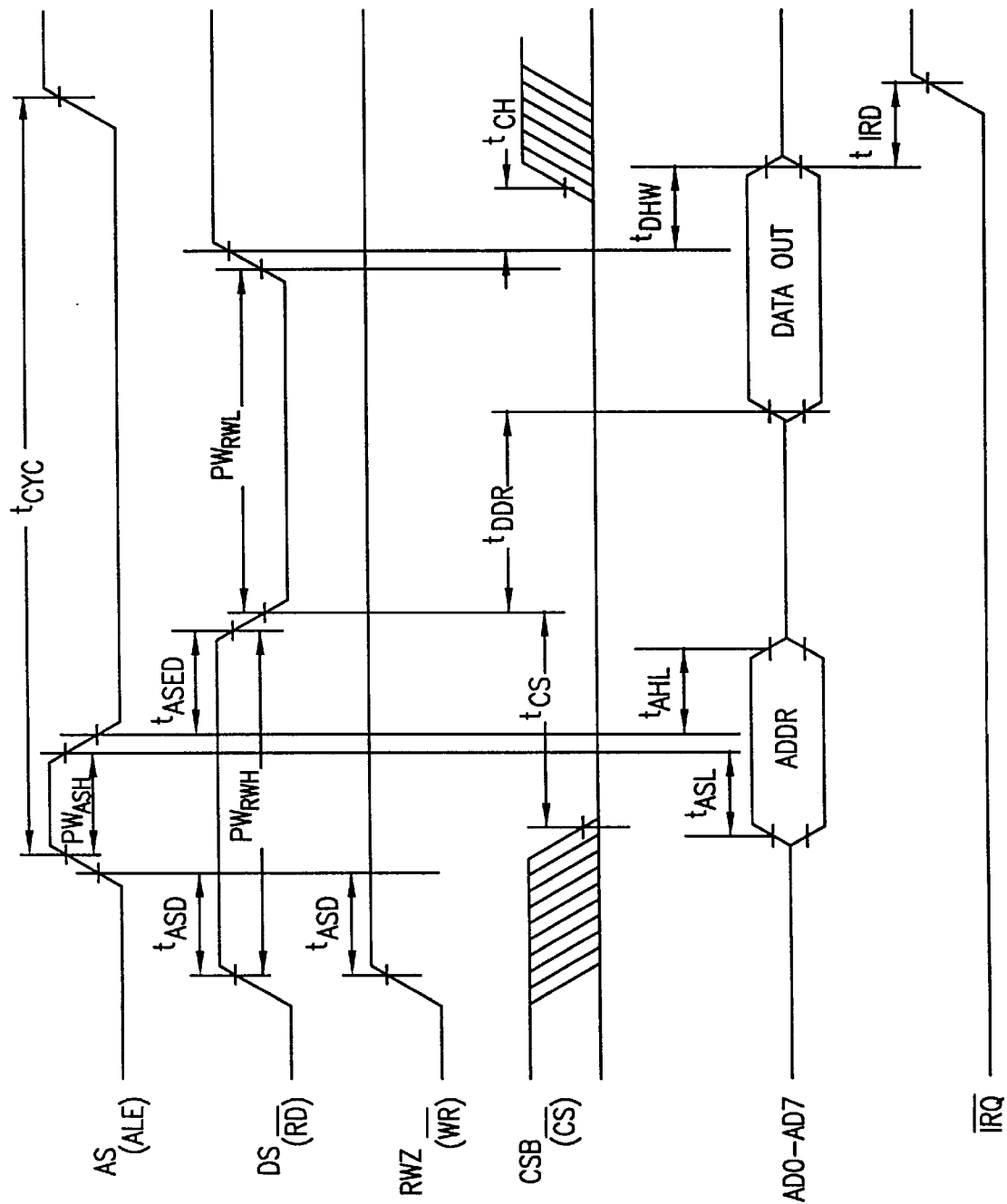
Figure 2C:
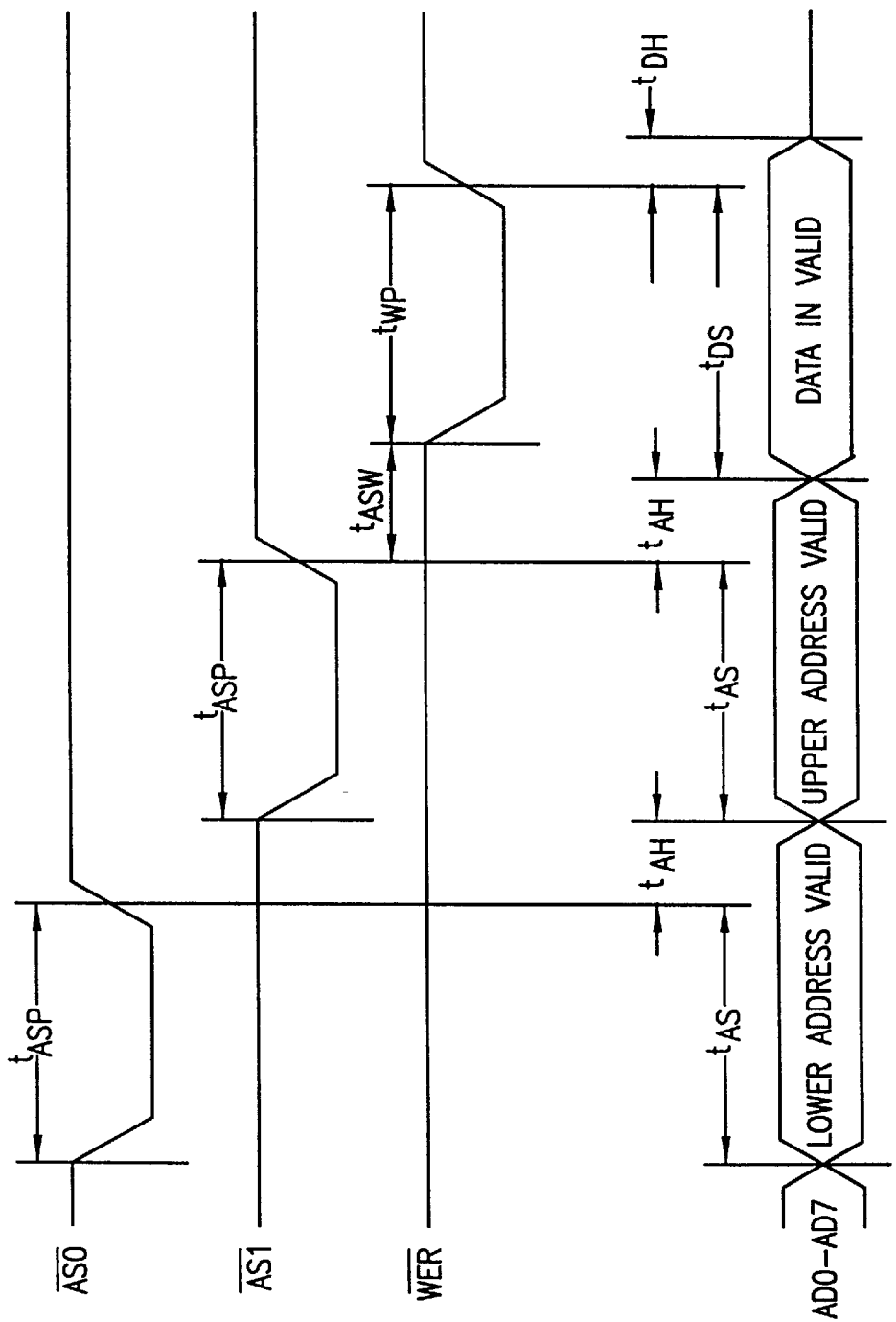
Figure 2D:
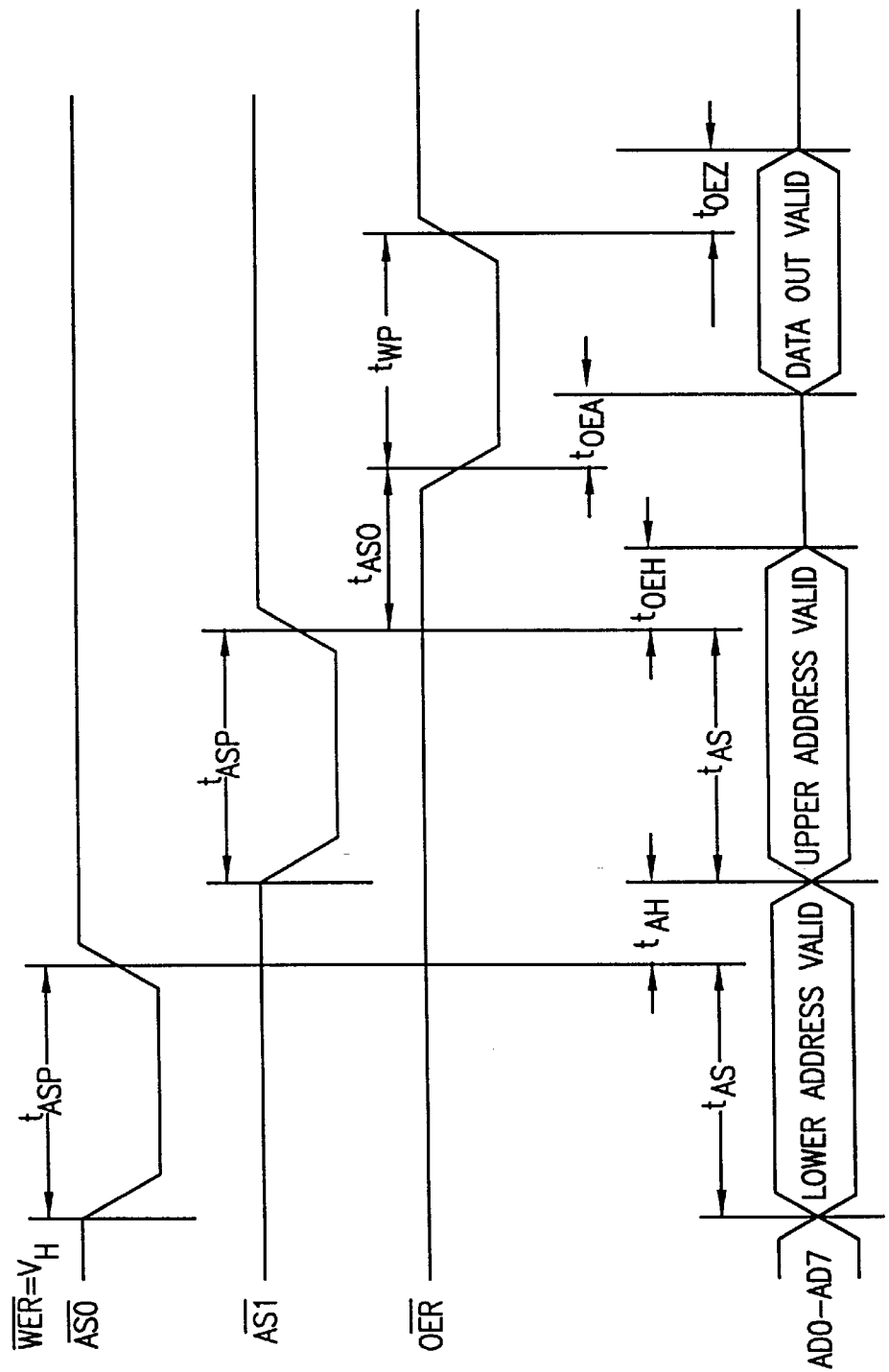

The hardware access uses four control signals, AS0\, AS1\, OER\, and WER\ to access the SRAM. This access mode is the same as known clock/memories such as the DS 1487. The address latches are loaded from the address/data bus AD0–AD7 in response to rising edge signals applied to the Address Strobe (AS0\) and Address Strobe 1 (AS1\) signals; see FIGS. 2c–d. AS1\ is used to latch the upper 5-bits of address. It is necessary to meet the setup and hold times with valid address information in order to properly latch the address. If the upper or lower order address is correct from a prior cycle, it is not necessary to repeat the address latching sequence.

A write operation in the hardware access method requires valid data to be placed on the address/data bus followed by the activation of the Write Enable RAM (WER\) line. Data on the bus will be written to the SRAM provided that the write timing specifications are met. During a read cycle, the Output Enable Ram (OER\) signal is driven active. Data from the SRAM will become valid on the bus provided that the SRAM read access timing specification is met. The WER\ and OER\ signals should never be active at the same time. In addition, access to the clock/calendar registers and user RAM (via CS\) must not be attempted when the 8K×8 SRAM is being accessed. The SRAM is enabled when either WER\ or OER\ is active. CS\ is only used for the access of the clock calendar registers (including the extended registers) and the 114 bytes of user RAM.

The software method allows access to the 8K×8 SRAM via three of the control registers shown in FIG. 3b. The registers in bank 1 must first be selected by setting the DV0 bit to 1 in Register A. The 13-bit address of the RAM location to be accessed must then be loaded into the two RAM address registers located at 50H and 51H. The least significant address byte should be written to location 50H, and the most significant 5 bits (right-justified) should be loaded in location 51H. Data in the addressed location may be read by performing a read operation from location 53H, or written by performing a write operation to location 53H. Data in any addressed location may be read or written repeatedly without changing the address in locations 50H, 51H.

With the software method, the SRAM may be accessed using only the control signals assigned to the clock/calendar and 114 byte user RAM; namely, ALE, CS\, WR\, and RD\. As a result, the RAM control signals (AS1\,AS0\, WER\, and OER\) do not have to be used and should be tied to their inactive levels. This appears in greater detail in the 8K×8 SRAM Acess section below.

Auxiliary Battery $V_{BAUX}$ input is provided to supply power from an auxiliary battery for the clock 100's kickstart, wake up, and SQW output features in the absence of $V_{CC}$. This power source must be available in order to use these auxiliary features when no $V_{CC}$ is applied to the device.

The Auxiliary Battery Enable (ABE; bank 1, register 04BH) bit in extended control register B is used to turn on and off the auxiliary battery for the above functions in the absence of $V_{CC}$. When set to a 1, $V_{BAUX}$ battery power is enabled, and when clear to 0, $V_{BAUX}$ battery power is disabled to these functions.

In the version of clock 100 without a packaged primary battery, this auxiliary battery may be used as the primary backup power source for maintaining the clock/calendar, user RAM, and extended RAM functions. This occurs if the $V_{BAT}$ is at a lower voltage than $V_{BAUX}$. If clock 100 is to be backed-up using a single battery with the auxiliary features enabled, then $V_{BAUX}$ should be used and connected to $V_{BAT}$. If $V_{BAUX}$ is not to be used, it should be grounded and ABE should be cleared to 0.

Wake up/Kickstart

Clock 100 incorporates a wake up feature which can power the system on at a predetermined date through activation of the PWR\ output pin. In addition, the kickstart feature can allow the system to be powered up in response to a low going transition on the KS\ pin, without operating voltage applied to the $V_{CC}$ pin. As a result, system power may be applied upon such events as a key closure, or modem ring detect signal. In order to use either the wake up or the kickstart features, clock 100 must have an axillary battery connected to the $V_{BAUX}$ pin and the oscillator must be running and the countdown chain must not be in reset (Register A: DV2, DV1, DV0=01X). If DV2, DV1 and DV0 are not in this required state, the PW\ output pin will not be driven low in response to a kickstart or wakeup condition, while in battery-backed mode.

The wake up feature is controlled through the Wake up Interrupt Enable bit in extended control register B (WIE, bank 1, 04BH). Setting WIE to 1 enables the wake up feature, clearing WIE to 0 disables it. Similarly, the kickstart feature is controlled through the Kickstart Interrupt Enable bit in extended control register B (KSE, bank 1, 04BH).

A wake up sequence will occur as follows: When wake up is enabled via WIE=1 while the system is powered down (no $V_{CC}$ voltage), the clock/calendar will monitor the current date for a match condition with the date alarm register (bank 1, register 049H). In conjunction with the date alarm register, the hours, minutes, and seconds alarm bytes in the clock/calendar register map (bank 0, registers 05H, 03H, and 01H) are also monitored. As a result, a wake up will occur at the date and time specified by the date, hours, minutes, and seconds alarm register values. This additional alarm will occur regardless of the programming of the AIE bit (bank 0, register B\, 0BH). When the match condition occurs, the PWR\ pin will automatically be driven low. This output can be used to turn on the main system power supply which provides $V_{CC}$ voltage to the DS1585/DS1587 as well as the the major components in the system. Also at this time, the Wake Up flag (WF, bank 1, register 04AH) will be set, indicating that a wake up condition has occurred.

A kickstart sequence will occur when kickstarting is enabled via KSE=1. While the system is powered down, the KS\ input pin will be monitored for a low going transition of minimum pulse width $t_{KSPW}$. When such a transition is detected, the PWR\ line will be pulled low, as it is for a wake up condition. Also at this time, the Kickstart Flag (KF, bank 1, register 04AH) will be set, indicating that a kickstart condition has occurred.

Figure 2E:
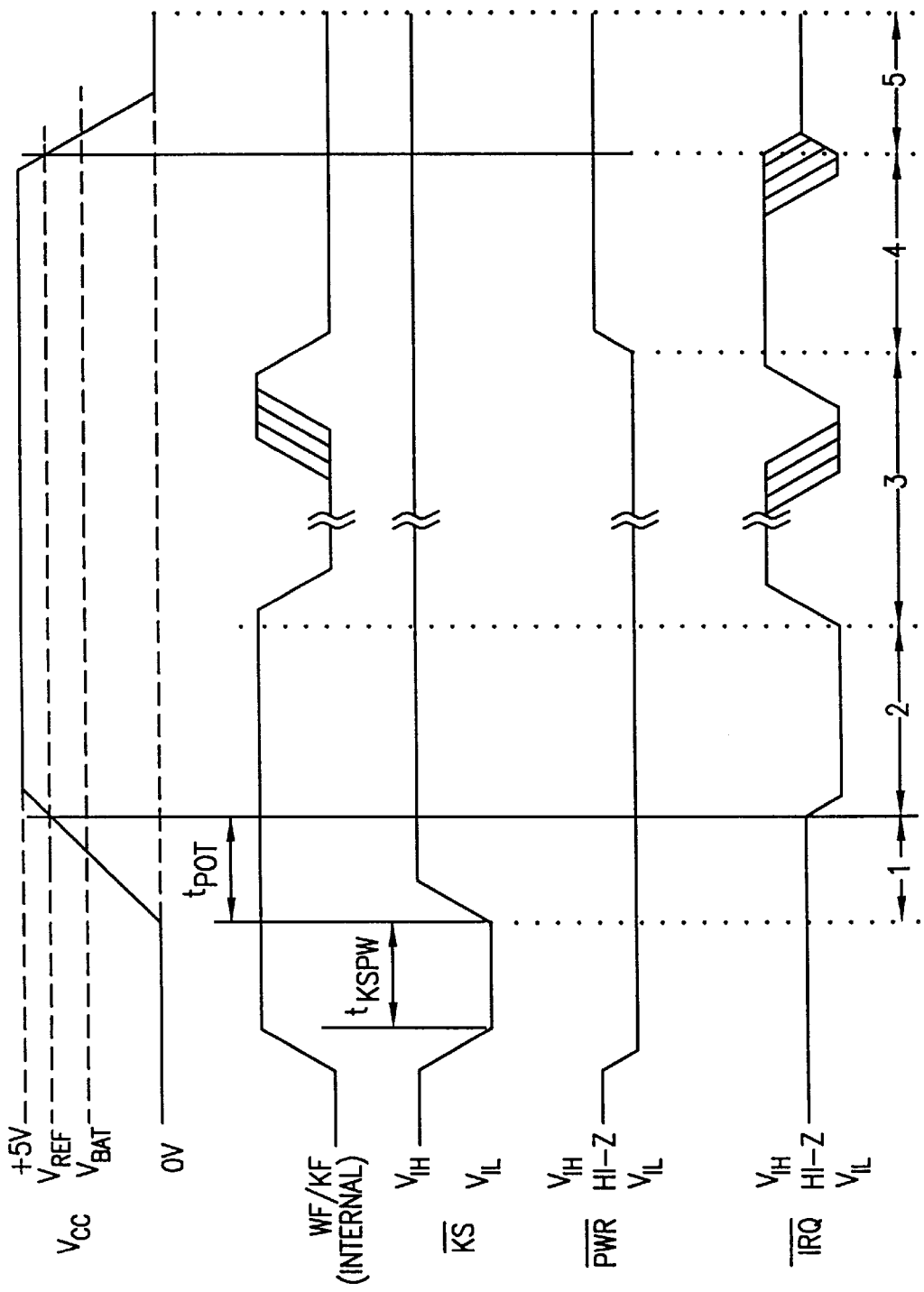

The timing associated with both the wake up and kickstarting sequences is illustrated in the Wake Up/Kickstart Timing Diagram FIG. 2e. The timing associated with these functions is divided into 5 intervals, labeled 1–5 in the Figure.

The occurrence of either a kickstart or wake up condition will cause the PWR\ pin to be driven low, as described above. During interval 1, if the supply voltage on $V_{CC}$ pin rises above the $V_{BAT}$ level before the power on timeout period ($t_{POTO}$) expires, then PWR\ will remain at the active low level. If $V_{CC}$ does not rise above $V_{BAT}$ voltage in this time, then the PWR\ output pin will be turned off and will return to its high impedance level. In this event, the IRQ\ pin will also remain tri-stated. The interrupt flag bit (either WF or KF) associated with the attempted power on sequence will remain set until cleared by software during a subsequent system power on.

If $V_{CC}$ is applied within the timeout period, then the system power on sequence will continue as shown in intervals 2–5 in the timing diagram. During interval 2, PWR\ \ will remain active and IRQ\ will be driven to its active low level, indicating that either WR of KF was set in initiating the power on. In the diagram KS\ is assumed to be initiating the power on. In the diagram KS\ is assumed to be pulled up to the $V_{BAUX}$ supply. Also at this time, the PAB bit will be automatically cleared to 0 in response to a successful power on. The PWR\ line will remain active as long as the PAB remains cleared to 0.

At the beginning of interval 3, the system processor has begun code execution and clears the interrupt condition of WF and/or KF by writing zeros to both of these control bits. As long as no other interrupt within clock 100 is pending, the IRQ\ line will be taken inactive once these bits are reset. Execution of the application software may proceed. During this time, both the wake up and kickstart functions may be used to generate status and interrupts. WF will be set in response to a date, hours, and minutes match condition. KF will be set in response to a low going transition on KS\. If the associated interrupt enable bit is set (WIE and/or KSE) then the IRQ\ line will be driven active low in response to enabled event. In addition, the other possible interrupt sources within clock 100 may cause IRQ\ to be driven low. While system power is applied, the on chip logic will always attempt to drive the PWR\ pin active in response to the enabled kickstart or wake up condition. This is true even if PWR\ was previously inactive as the result of power being applied by some means other than wake up or kickstart.

The system may be powered down under software control by setting the PAB bit to a logic 1. This causes the open-drain PWR\ pin to be placed in a high impedance state, as show at the beginning of interval 4 in the timing diagram. As $V_{CC}$ voltage decays, the IRQ\ output pin will be placed in a high impedance state when $V_{CC}$ goes below $V_{PF}$. If the system is to be again powered on in response to a wake up or kickstart, then both the WF and KF flags should be cleared and WIE and/or KSE should be enabled prior to setting the PAB bit.

During interval 5, the system is fully powered down. Battery backup of the clock calendar and nonvolatile RAM is in effect, PWR\ and IRQ\ are tri-stated, and monitoring of wake up and kickstart takes place.

RAM Clear

Clock 100 provides a RAM clear function for the 114 bytes of user RAM. When enabled, this function can be performed regardless of the condition of the $V_{CC}$ pin.

The RAM clear function is enabled or disabled via the RAM Clear Enable bit (RCE; bank 1, register 04BH). When this bit is set to a logic 1, the 114 bytes of user RAM will be cleared (all bits set to 1) when an active low transition is sensed on the RCLR\ pin. This action will have no effect on either the clock/calendar settings or upon the contents of the 8K×8 Extended RAM. The RAM clear Flag (RF, bank 1, register 04BH) will be set when the RAM clear operation has been completed. If $V_{CC}$ is present at the time of the RAM clear and RIE=1, the IRQ\ line will also be driven low upon completion. The interrupt condition can be cleared by writing a zero to the RF bit. The IRQ\ line will then return to its inactive high level provided there are no other pending interrupts. Once the RCLR\ pin is activated, al read/write accesses are locked out for a minimum recover time, specified at $t_{REC}$ in the Electrical Characteristics section.

When RCE is cleared to zero, the RAM clear function is disabled. The state of the RCLR\ pin will have no effect on the contents of the user RAM and transitions on the RCLR\ pin have no effect on RF.

Extended Registers

Two extended control registers are provided supply controls and status information for the extended features offered by clock 100. These are designated as Extended control registers A and B and are located in register bank 1, locations (in hex) 4A and 4B, respectively; see FIG. 3b. The functions of the bits within these registers are described as follows:

EXTENDED CONTROL REGISTER A

| MSB | | | | | | | LSB |
|---|---|---|---|---|---|---|---|
| BIT 7 | BIT 6 | BIT 5 | BIT 4 | BIT 3 | BIT 2 | BIT 1 | BIT 0 |
| VRT2 | INCR | * | * | PAB | RF | WF | KF |

*-Reserved bits. These bits are reserved for future use. They can be read and written, but have no effect on operation. written, but have no effect on operation.
VRT2-This status bit gives the condition of the auxiliary battery. It is set to a logic 1 conditio when the external lithium battery is connected to $V_{BAUX}$. If this bit is read as a logic 0, the external battery should be replaced.
INCR-Increment in Progress status bit. This bit is set to a 1 when an increment is in progress to the time/date registers and the alarm checks are being made. INCR will be set to a 1 at 122 $\mu$s before the update cycle starts and will be cleared to 0 at the end of each update cycle.
PAB-Power Active Bar control bit. When this bit is 0, the PWR\ pin is in the active low state. This bit can be written to a logic 1 or 0 by the user. If either WF AND WIE = 1 OR KP AND KSE = 1, the PAB bit will be cleared to 0.
RP-Ram Clear Flag. This bit will be set to a logic when a high to low transition occurs on the RCLR\ input (pin 4) if RCE = 1. The RF bit is cleared by writing it to a logic 0. This bit can also be written to a logic 1 to force an interrupt condition.
WF-Wake Up Alarm Flag-This bit is set to 1 when a wake up alarm condition occurs or when the user writes it to a 1. WF is cleared by writing it to a 0.
KF-Kickstart Flag-This bit is set to a 1 when a kickstart condition occurs or when the user writes it to a 1. This bit is cleared by writing it to a logic 0.

VRT2—This status bit gives the condition of the auxiliary battery. It is set to a logic 1 conditio when the external lithium battery is connected to $V_{BAUX}$. If this bit is read as a logic 0, the external battery should be replaced.

INCR—Increment in Progress status bit. This bit is set to a 1 when an increment is in progress to the time/date registers and the alarm checks are being made. INCR will be set to a 1 at 122 $\mu$s is before the update cycle starts and will be cleared to 0 at the end of each update cycle.

PAB—Power Active Bar control bit. When this bit is 0, the PWR\ pin is in the active low state. This bit can be written to a logic 1 or 0 by the user. If either WF AND WIE=1 OR KF AND KSE=1, the PAB bit will be cleared to 0.

RF—Ram Clear Flag. This bit will be set to a logic when a high to low transition occurs on the RCLR\ input (pin 4) if RCE=1. The RF bit is cleared by writing it to a logic 0. This bit can also be written to a logic 1 to force an interrupt condition.

WF—Wake Up Alarm Flag—This bit is set to 1 when a wake up alarm condition occurs or when the user writes it to a 1. WF is cleared by writing it to a 0.

KF—Kickstart Flag—This bit is set to a 1 when a kickstart condition occurs or when the user writes it to a 1. This bit is cleared by writing it to a logic 0.

EXTENDED CONTROL REGISTER B

| MSB | | | | | | | LSB |
|---|---|---|---|---|---|---|---|
| BIT 7 | BIT 6 | BIT 5 | BIT 4 | BIT 3 | BIT 2 | BIT 1 | BIT 0 |
| ABE | E32K | * | RCE | * | RIE | WIE | KSE |

*-Reserved bits. These bits are reserved for future use. They can be read and written, but have no effect on operation.
ABE-Auxiliary Battery Enable. This bit when written to a logic 1 will enable the $V_{BAUX}$ pin (pin 26) for extended functions. On the DS1587 with an embedded lithium cell, this bit is shipped from the factory set to a logic 0.
E32K-Enable 32,768 output. This bit when written to a logic 1 will enable the 32,768 Hz oscillator frequency to be output on the SQW pin (pin 27) provided SQWE = 1.
RCE-RAM Clear Enable bit. When set to a 1, this bit enables a low level on pin 4 (RCLR\) to clear all 114 bytes of user RAM. When RCE = 0, pin 4 and the RAM clear function are disabled.
RIE-Ram Clear Enable Bit. When RIE is set to a 1, the IRQ\ pin will be driven low when a RAM clear function is completed.
WIE-Wake Up Alarm Interrupt Enable. When $V_{CC}$ voltage is absent and WIE is set to a 1, the PWR\ pin will be driven active low when a wake up condition occurs, causing the WF bit to be set to 1. When $V_{CC}$ is then applied, the IRQ\ pin will also be driven low. If WIE is set while system power is applied, both IRQ\ and PWR\ will be driven low in response to WF being set to 1. When WIF is cleared to a 0, the WF will have no effect on the PWR or IRQ\ pins.
KSE-Kickstart Interrupt Enable. When $V_{CC}$ voltage is absent and KSE is set to a 1, the PWR pi will be driven active low when a kickstart condition occurs (KSpulsed low), causing the KF bit to be set to 1. When $V_{CC}$ is then applied, the IRQpin will also be driven low. If KSE is set to 1 while system power is applied, both IRQand PWRwill be driven low in response to KF being set to 1. When KSE is cleared to a 0, the KF bit will have no effect on the PWR or IRQ\ pins.

ABE—Auxiliary Battery Enable. This bit when written to a logic 1 will enable the $V_{BAUX}$ pin (pin 26) for extended functions. On the DS1587 with an embedded lithium cell, this bit is shipped from the factory set to a logic 0.

E32K—Enable 32,768 output. This bit when written to a logic 1 will enable the 32,768 Hz oscillator frequency to be output on the SQW pin (pin 27) provided SQWE=1.

RCE—RAM Clear Enable bit. When set to a 1, this bit enables a low level on pin 4 (RCLR\) to clear all 114 bytes of user RAM. When RCE=0, pin 4 and the RAM clear function are disabled.

RIE—Ram Clear Enable Bit. When RIE is set to a 1, the IRQ\ pin will be driven low when a RAM clear function is completed.

WIE—Wake Up Alarm Interrupt Enable. When $V_{CC}$ voltage is absent and WIE is set to a 1, the PWR\ pin will be driven active low when a wake up condition occurs, causing the WF bit to be set to 1. When $V_{CC}$ is then applied, the IRQ\ pin will also be driven low. If WIE is set while system power is applied, both IRQ\ and PWR\ will be driven low in response to WF being set to 1. When WIF is cleared to a 0, the WF will have no effect on the PWR\ or IRQ\ pins.

KSE—Kickstart Interrupt Enable. When $V_{CC}$ voltage is absent and KSE is set to a 1, the PWR\ pi will be driven active low when a kickstart condition occurs (KS\ pulsed low), causing the KF bit to be set to 1. When $V_{CC}$ is then applied, the IRQ\ pin will also be driven low. If KSE is set to 1 while system power is applied, both IRQ\ and PWR\ will be driven low in response to KF being set to1. When KSE is cleared to a 0, the KF bit will have no effect on the PWR\ or IRQ\ pins.

| Parameter | Symbol | MIN | TYP | MAX | UNITS | NOTES |
|---|---|---|---|---|---|---|
| RECOMMENDED DC OPERATING CONDITIONS (0° C. TO 70° C.) | | | | | | |
| Power Supply Voltage | $V_{CC}$ | 4.5 | 5.0 | 5.5 | V | 1 |
| Input Logic 1 | $V_{IH}$ | 2.2 | | $V_{cc}$ + 0.3 | V | 1 |
| Input Logic 0 | $V_{IL}$ | -0.3 | | +0.8 | V | 1 |
| Battery Voltage | $V_{BAT}$ | 2.5 | | 3.7 | V | 10 |
| Auxiliary Battery Voltage | $V_{BAUX}$ | 2.5 | | 3.7 | V | 10 |

-continued

| Parameter | Symbol | MIN | TYP | MAX | UNITS | NOTES |
|---|---|---|---|---|---|---|
| DC ELECTRIC CHARACTERISTICS (0° C. TO 70° C.) | | | | | | |
| Power Supply Current | $I_{CC1}$ | | 35 | 50 | mA | 2 |
| Standby Current CS/ = $V_{CC}$ − 0.3 V | $I_{CC2}$ | | 1 | 5.0 | mA | 6 |
| Input Leakage | $I_{IL}$ | −1.0 | | +1.0 | μA | 3 |
| I/O Leakage | $I_{LO}$ | −1.0 | | +1.0 | μA | 3, 4 |
| Output @ 2.4 V | $I_{OH}$ | −1.0 | | | mA | 1, 4 |
| Output @ 0.4 V | $I_{OL}$ | | | 4 | mA | 1 |
| Power Fail Trip Point | VPF | | 4.25 | | V | 1 |
| PWR\ Output @ 0.4 V | $I_{OLPWR}$ | | | 10.0 | mA | 1 |

Circuit Operation

Figure 5B:
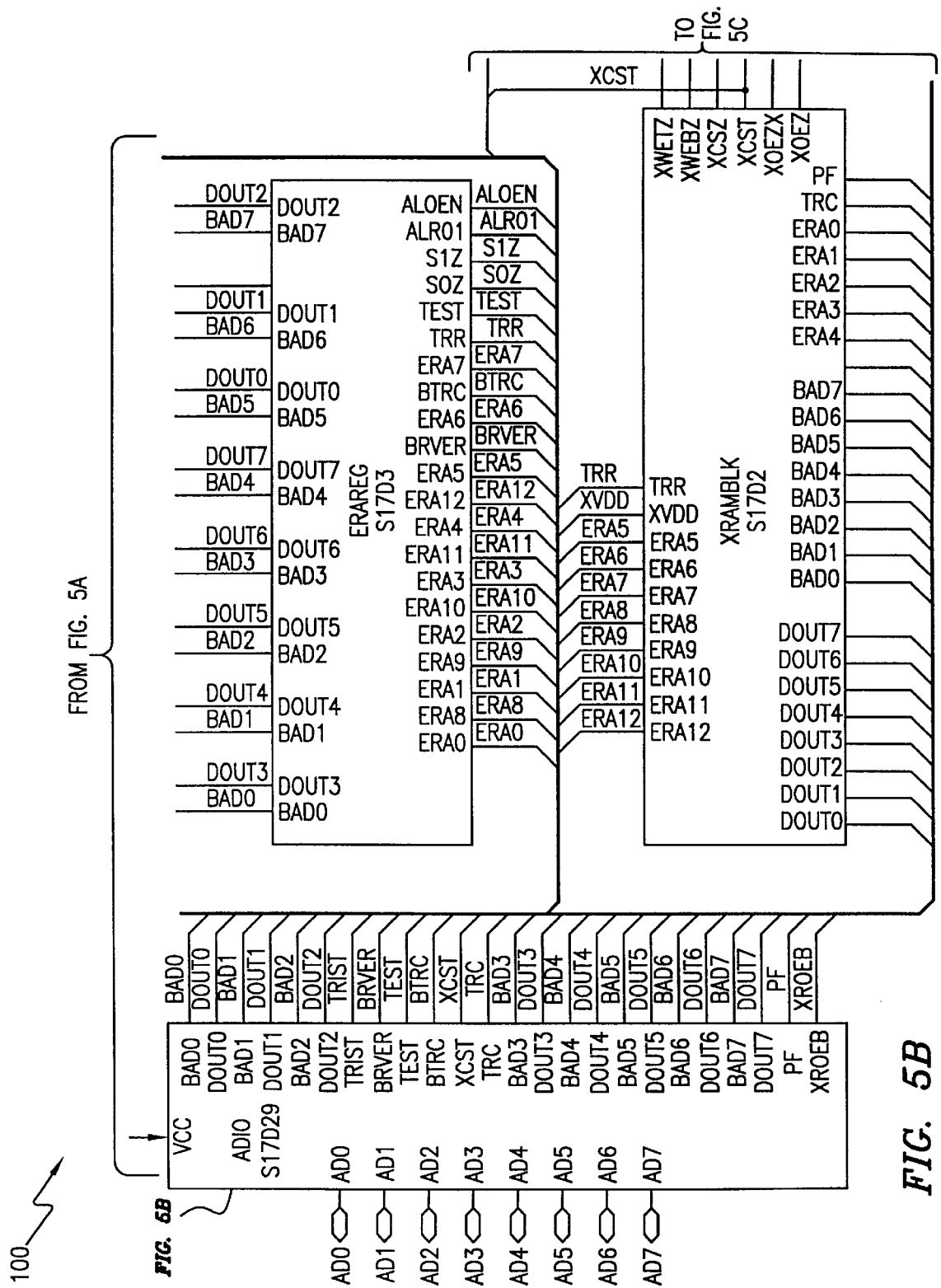
Figure 5C:
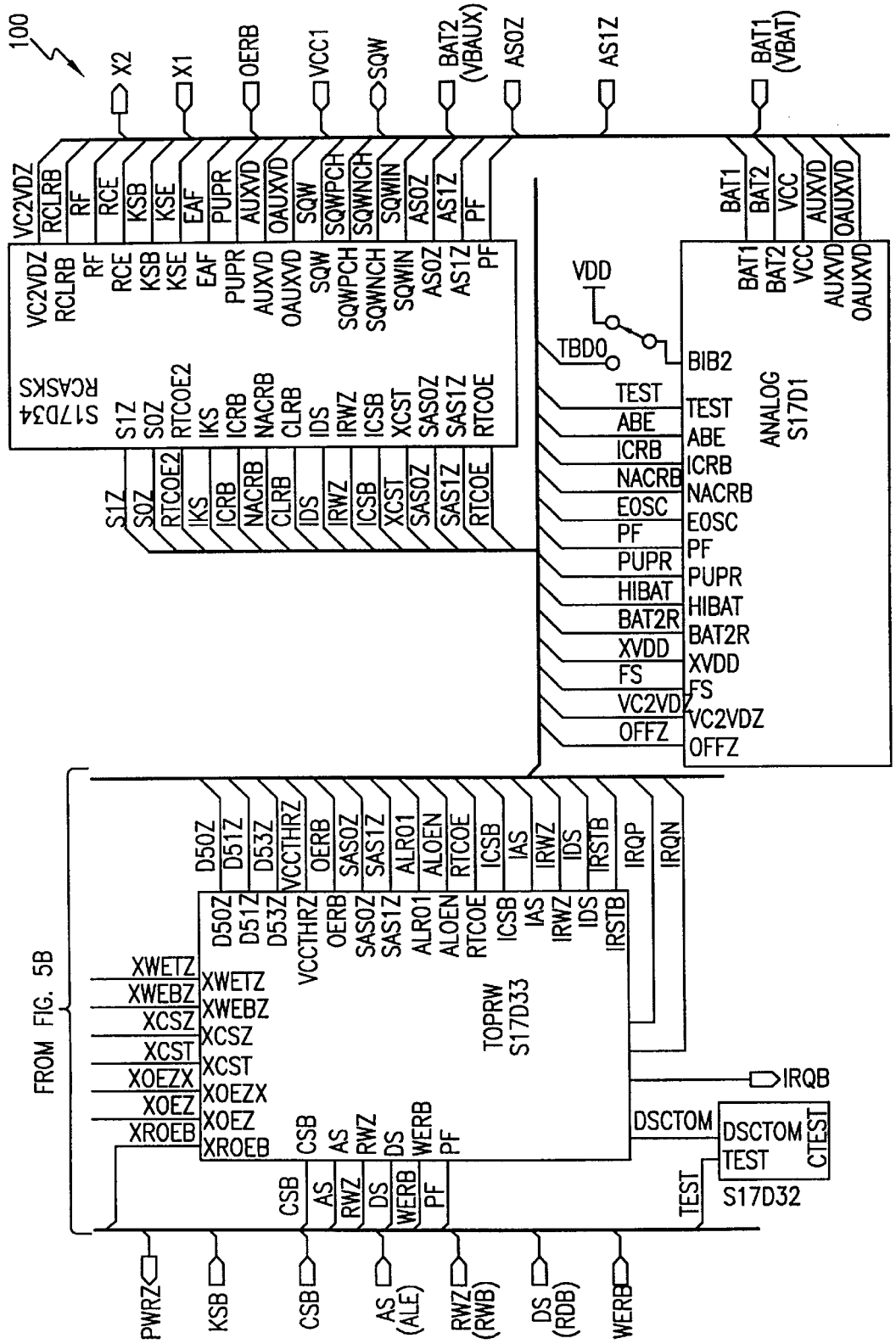

FIGS. 5A–5C, taken together, depict is a structural schematic diagram of clock 100 which includes blocks ADIO (address/data input/output), ERAREG (memory address stack for hardware access), TOPRW (memory control), XRAMBLK (8K×8 nonvolatile SRAM), BLKS85 (real time clock and 114 bytes of user RAM in two banks for the upper 64 bytes), RCASKS (address strobe logic), ANALOG (oscillator, power switch, and bandgap generator), CETST (testing), and the bus interconnecting the blocks plus the terminals. Note that some of the terminals have slightly different names from the foregoing description: CS\ is CSB, ALE is AS, WR\ is RWZ, RD\ is DS, WER\ is WERB, OER\ is OERB, AS0\ is AS0Z, AS1544 is AS1Z, KS\ is KSB, IRQ\ is IRQB, VCC is VCCI, $V_{BAT}$ is BAT\ 1, $V_{BAUX}$ is BAT2, and the grounds GND and BGND are not shown in FIGS. 5A–5C.

8K×8 SRAM Access

The hardware and software modes of access to the 8K×8 nonvolatile SRAM 112 use different external signals as illustrated in FIGS. 2a–d.

Figure 8:
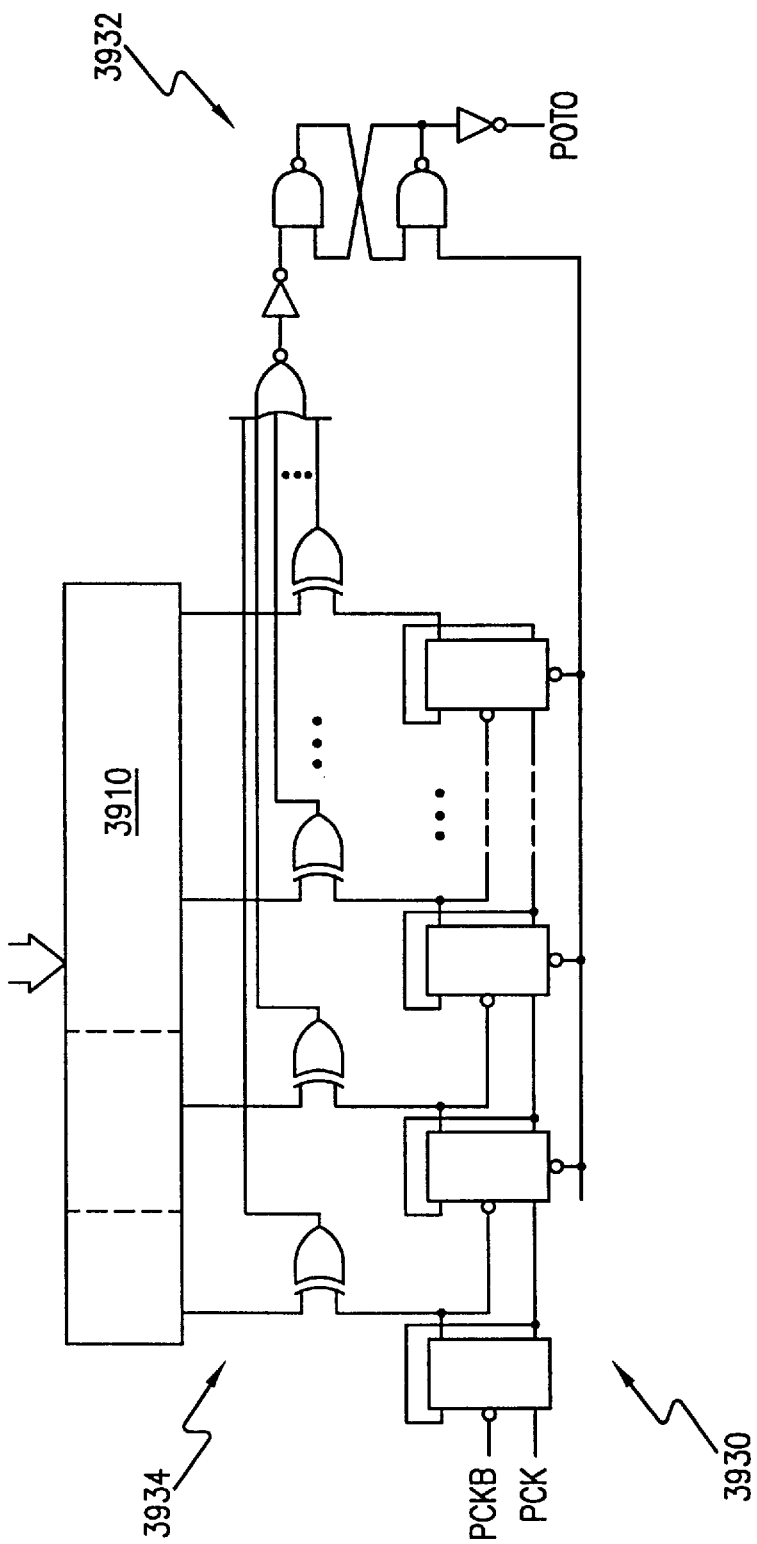

FIG. 8 shows an alternative a counter with a NAND gate in order to have a programmable power on time out interval. Programmability of time interval 1 permits adaptation of clock 100 to characteristics of the particular power supply being activated by the PRWZ output terminal. That is, if the power supply has a very slowly rising voltage, such as due to large filter capacitors being charged up, then the time interval 1 should be lengthened. The alternative of FIG. 8 uses register 3910 and match logic XOR gates 3934 to compare the count of counter 3930 with the contents of register 3910. When the count reaches a match, then latch 3932 switches analogous to latch 3732 switching, and the remainder of the operation is as before. Register 3910 may have an address in bank 1.

Modifications and Variations

The preferred embodiments can be modified in various ways while retaining oen or more of the features of software access of the SRAM, software bank 0–bank 1 switching, selective bitline pullups, automatic arbitration for user-writable-flag-bits, RAM clear, multiple battery use with appropriate power switching for auxiliary functions, and programmable power on tine out delays. That is, the specific parameters such as oscillator frequency, memory size, memory cell structure, bus widths, address widths, data widths, transistor types and sizes, register size and location, the number of banks and switching control bits, the number of batteries and switching selection, and so forth.

What is claimed is:

1. A circuit, comprising:
   a clock portion including:
      an oscillator for providing a wave output of a predetermined shape and frequency;
      a plurality of dividers coupled to said oscillator, each of said plurality of dividers for successively dividing said wave output by a predetermined factor;
      a clock/calender updater coupled to at least one of said plurality of dividers;
   a first memory for receiving and storing a time value, which time value is provided by said clock portion, wherein said first memory is addressable by a first address bus;
   a plurality of control registers coupled to said clock/calender updater, at least for controlling the updating of said time value; and
   a second memory addressable by a second address bus,
   wherein said second memory is accessed by one of a direct address access and an indirect address access, said indirect address access involving accessing at least a portion of said first memory.

2. The circuit as set forth in claim 1, wherein said first address bus comprises an 8-bit bus.

3. The circuit as set forth in claim 1, wherein said second address bus comprises a 13-bit bus.

4. A clock circuit, comprising:
   an oscillator for providing a wave output of a predetermined shape and frequency;
   a plurality of dividers coupled to said oscillator, each of said plurality of dividers for successively dividing said wave output by a predetermined factor;
   a clock/calender updater coupled to at least one of said plurality of dividers;
   a first memory for storing a plurality of timekeeping data values, said memory coupled to said clock/calender updater for updating at least one of said plurality of timekeeping data values, wherein said memory is addressable by a first bus; and
   a plurality of control registers coupled to said clock/calender updater, at least for controlling the updating of said plurality of timekeeping data values.

5. The clock circuit as set forth in claim 4, further comprising:
   a second memory, addressable by a second address bus, wherein said second memory is accessible by at least one of a direct address access and one of an indirect address access, said indirect address access involving accessing at least a portion of said first memory.

* * * * *

UNITED STATES PATENT AND TRADEMARK OFFICE
CERTIFICATE OF CORRECTION

PATENT NO.    : 5,829,008
DATED         : October 27, 1998
INVENTOR(S)   : Podkowa et al.

It is certified that error appears in the above-identified patent and that said Letters Patent is hereby corrected as shown below:

Column 2,
Line 12, replace "19-20" with -- 6-7 --
Line 14, replace "39" with -- 8 --
Line 26, replace "of of" with -- of --
Line 38, replace "sufficx" with -- suffix --

Column 3,
Line 64, replace "defmes" with -- defines --

Column 4,
Line 6, replace "clcok" with -- clock --

Column 7,
Line 51, replace "\-Instead" with -- Instead --

Column 8,
Line 21, replace "\-no" with -- no --
Line 46, replace "pr" with -- per --
Line 59, replace "pr" with -- per --

Column 9,
Line 18, replace "the t least" with -- the user has at least --
Line 63, replace "cam" with -- can --

Column 10,
Line 1, replace "$\mu$us" with -- $\mu$s --
Line 23, replace "patten" with -- pattern --
Line 25, replace "patten" with -- pattern --
Lines 46-67, delete in its entirety (duplicative)

Column 11,
Lines 1-14, delete in its entirety (duplicative)

Column 12,
Line 32, replace " (UP) " with -- (UF) --
Lines 46-53, delete in its entirety (duplicative)

Column 15,
Line 13, replace "PW\ output" with -- PWR\ --
Line 34, replace "B\," with -- B, --

UNITED STATES PATENT AND TRADEMARK OFFICE
CERTIFICATE OF CORRECTION

PATENT NO.   : 5,829,008
DATED        : October 27, 1998
INVENTOR(S)  : Podkowa et al.

It is certified that error appears in the above-identified patent and that said Letters Patent is hereby corrected as shown below:

Column 16,
Line 1, replace "PWR\\" with -- PWR\ --
Line 61, replace "al" with -- all --

Column 17,
Lines 16-31, delete in its entirety (duplicative)
Line 33, replace "conditio" with -- condition --

Column 18,
Lines 1-23, delete in its entirety (duplicative)

Figure 6:
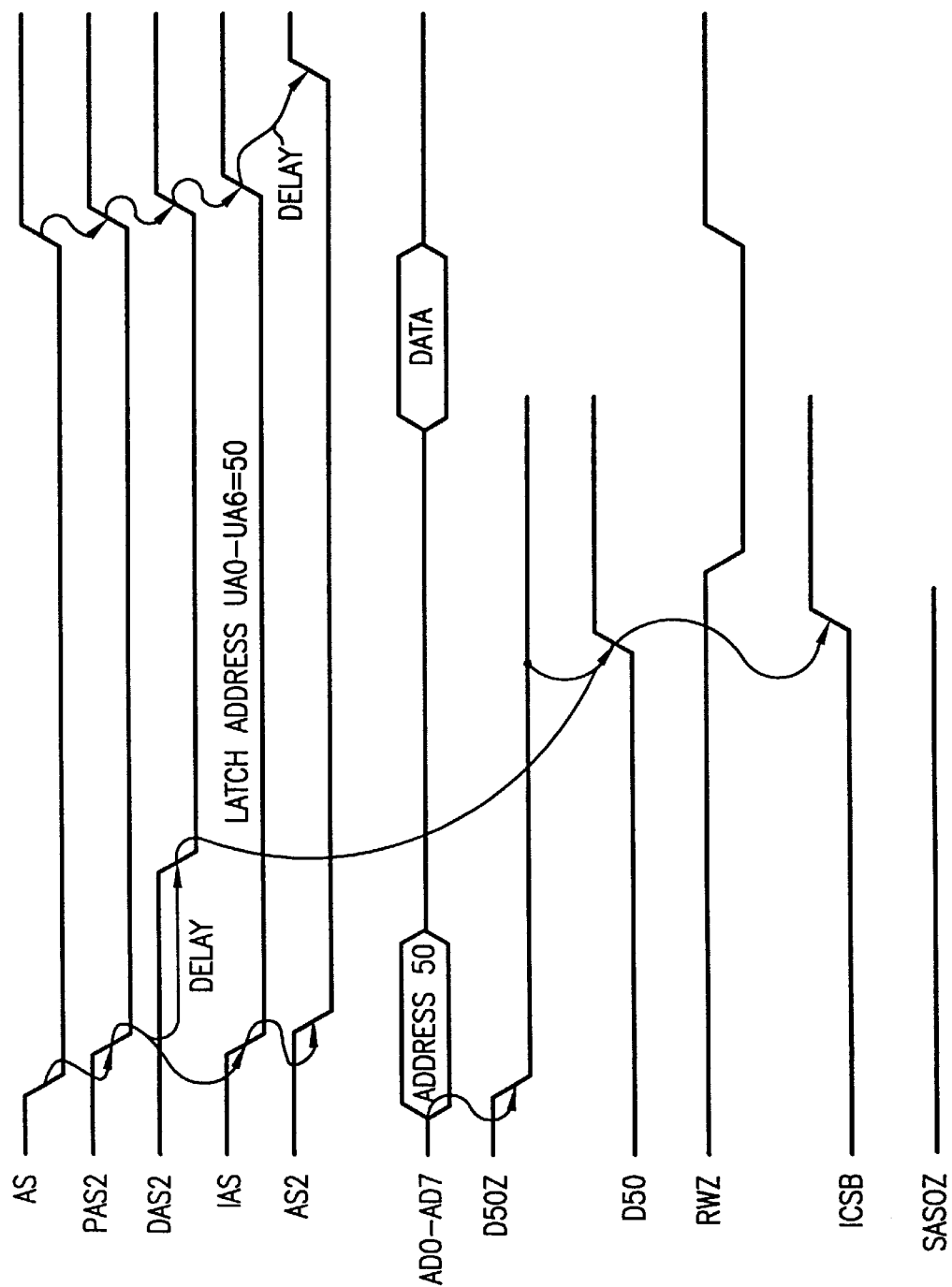
Figure 7:
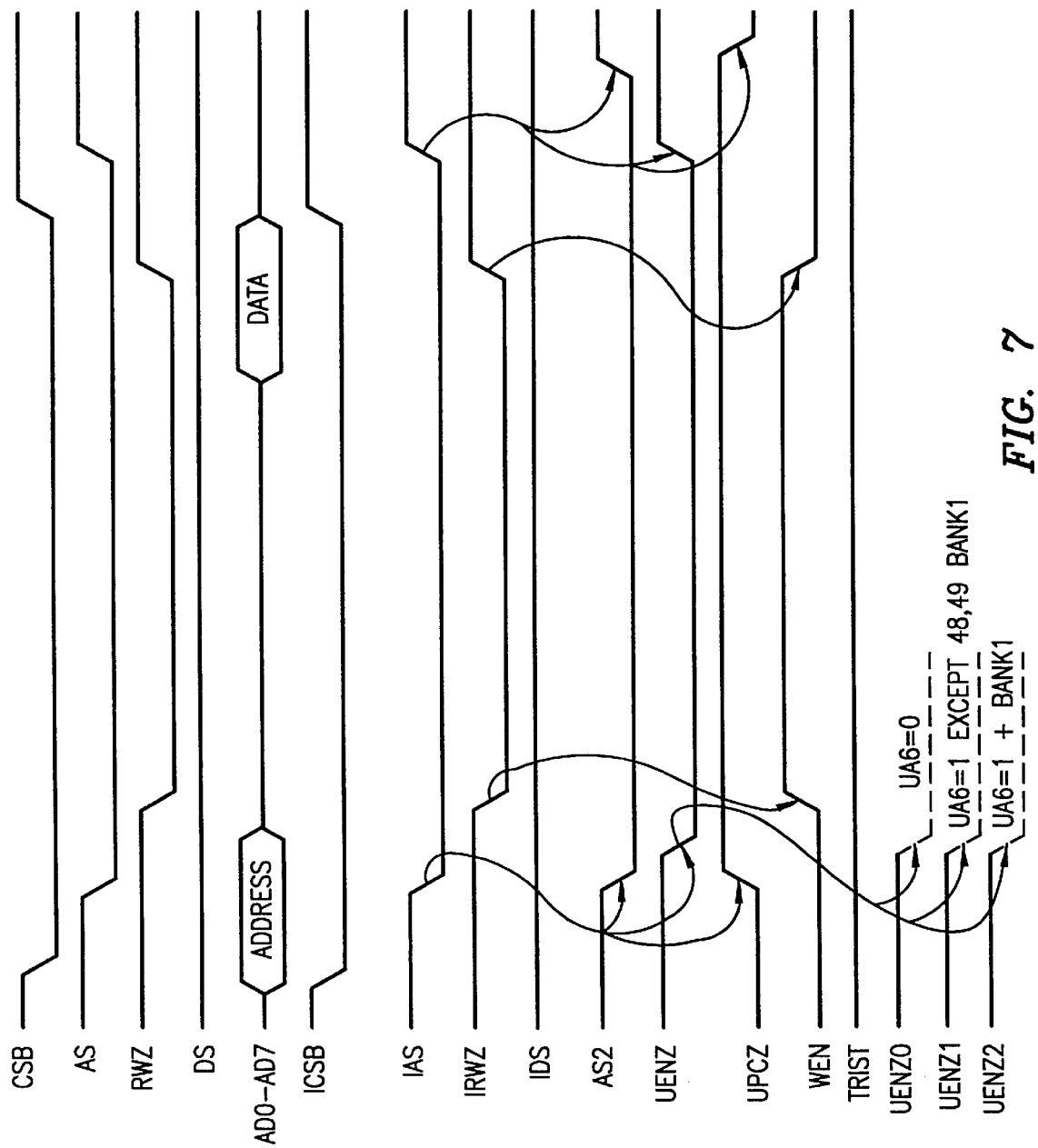

Column 19,
Line 14, replace "VPF" with -- $V_{PF}$ --
Line 33, replace "AS1544" with -- AS1\ --
Line 34, replace "BAT\" with -- BAT --
Line 42, please add
           -- FIG. 6 illustrates the timing relationships, presuming no power failure and C5B=0.
           FIG. 7 shows the timing for a write as in FIG. 2a. --
Line 43, replace "alternative a" with -- alternative to a --
Line 60, replace "oen" with -- one --

Column 20,
Line 35, replace "1" with -- 6 --

Signed and Sealed this

Twenty-fifth Day of June, 2002

Attest:

Attesting Officer

JAMES E. ROGAN
Director of the United States Patent and Trademark Office